US007706447B2

(12) United States Patent
Karczewicz et al.

(10) Patent No.: US 7,706,447 B2
(45) Date of Patent: Apr. 27, 2010

(54) SWITCHING BETWEEN BIT-STREAMS IN VIDEO TRANSMISSION

(75) Inventors: Marta Karczewicz, Irving, TX (US); Ragip Kurceren, Irving, TX (US)

(73) Assignee: Nokia Corporation, Espoo (FI)

(*) Notice: Subject to any disclaimer, the term of this patent is extended or adjusted under 35 U.S.C. 154(b) by 888 days.

(21) Appl. No.: 10/250,838

(22) PCT Filed: Jan. 3, 2002

(86) PCT No.: PCT/FI02/00004

§ 371 (c)(1),
(2), (4) Date: Jan. 9, 2004

(87) PCT Pub. No.: WO02/054776

PCT Pub. Date: Jul. 11, 2002

(65) Prior Publication Data

US 2004/0114684 A1    Jun. 17, 2004

Related U.S. Application Data

(60) Provisional application No. 60/259,529, filed on Jan. 3, 2001.

(51) Int. Cl.
*H04N 7/12* (2006.01)
(52) U.S. Cl. ............... 375/240.2; 375/240.13; 375/240.16; 375/240.12; 382/233; 382/238
(58) Field of Classification Search ............ 375/12, 375/13, 16; 382/233
See application file for complete search history.

(56) References Cited

U.S. PATENT DOCUMENTS 5,386,234 A    1/1995    Veltman et al.
(Continued)

FOREIGN PATENT DOCUMENTS

CA    2 274 181    6/1998
EP    1045589    10/2000
(Continued)

OTHER PUBLICATIONS

IEEE International Conference on Image Processing 1997 Proceedings, vol. 2, Oct. 1997 Niko Farber et al., "Robust H.263 Compatible Video Transmission for Mobile Access to Video Servers" (Farber).*

(Continued)

*Primary Examiner*—Tung Vo
*Assistant Examiner*—Anner Holder

(57) ABSTRACT

A method for transmitting video information is shown, in which at least a first bit-stream (510) and a second bit-stream are formed. The first bit-stream (510) includes a video frame, and the second bit-stream (520) includes a predictive video frame (524). Different encoding parameters are used with encoding of the frames of the first bit-stream (510) and the second bit-stream (520). A frame of the first bit-stream (510) is transmitted, and the transmission is switched over from the first (510) to the second bit-stream (520) during which a secondary switching frame (550) is transmitted encoded using the encoding parameters of the second bit-stream (520) and at least one reference frame from the first bit-stream (510). The secondary switching frame (550) is used as a reference frame in the reconstruction of the predictive video frame (524) of the second set of video frames.

25 Claims, 11 Drawing Sheets

U.S. PATENT DOCUMENTS

| | | | |
|---|---|---|---|
| 5,708,732 A * | 1/1998 | Merhav et al. | 382/232 |
| 5,903,310 A | 5/1999 | Finotello et al. | |
| 5,970,172 A * | 10/1999 | Mochizuki | 382/233 |
| 6,002,440 A | 12/1999 | Dalby et al. | 375/240.12 |
| 6,012,091 A | 1/2000 | Boyce | |
| 6,137,834 A | 10/2000 | Wine et al. | |
| 6,148,109 A * | 11/2000 | Boon et al. | 382/238 |
| 6,160,844 A | 12/2000 | Wilkinson | |
| 6,163,575 A | 12/2000 | Nieweglowski et al. | |
| 6,175,595 B1 | 1/2001 | Keesman | |
| 6,192,078 B1 | 2/2001 | Komiya et al. | |
| 6,212,235 B1 | 4/2001 | Nieweglowski et al. | |
| 6,229,854 B1 | 5/2001 | Kikuchi et al. | |
| 6,393,055 B1 | 5/2002 | Martin | |
| 6,393,057 B1 | 5/2002 | Thoreau et al. | |
| 6,414,999 B1 | 7/2002 | Igi et al. | |
| 6,434,195 B1 | 8/2002 | Luthra et al. | |
| 6,452,971 B1 | 9/2002 | Iwasaki et al. | |
| 6,493,389 B1 | 12/2002 | Bailleul | |
| 6,501,798 B1 | 12/2002 | Sivan | |
| 6,516,002 B1 | 2/2003 | Huang et al. | |
| 6,529,555 B1 | 3/2003 | Saunders et al. | |
| 6,560,365 B1 * | 5/2003 | Nakayama et al. | 382/233 |
| 6,611,624 B1 | 8/2003 | Zhang et al. | 382/232 |
| 6,618,438 B1 | 9/2003 | LeRoux et al. | |
| 6,633,678 B2 | 10/2003 | Boon | |
| 6,658,056 B1 | 12/2003 | Durouz et al. | |
| 6,765,963 B2 | 7/2004 | Karczewicz et al. | |
| 6,804,301 B2 | 10/2004 | Wu et al. | 375/240.12 |
| 6,956,600 B1 | 10/2005 | Gaylord | 348/14.08 |
| 7,046,910 B2 | 5/2006 | Chen et al. | 386/68 |
| 7,075,986 B2 * | 7/2006 | Girod et al. | 375/240.12 |
| 2002/0118755 A1 | 8/2002 | Karczewicz et al. | |
| 2003/0142744 A1 | 7/2003 | Wu et al. | 375/240.03 |
| 2004/0013202 A1 | 1/2004 | Lainema | 375/240.18 |
| 2006/0126733 A1 | 6/2006 | Boyce et al. | 375/240.12 |

FOREIGN PATENT DOCUMENTS

| | | |
|---|---|---|
| EP | 1079631 | 2/2001 |
| WO | 9114340 | 9/1991 |
| WO | 0111891 | 2/2001 |

OTHER PUBLICATIONS

ITU-Telecommunications Standardization Sector, Document VCEG-L45 12th meeting, Eibsee, Germany, Jan. 9-12, 2001.

ITU-Telecommunications Standardization Sector, Document Q15-K-59 Eleventh Meeting: Portland, Oregon, Aug. 22-25, 2000.

ITU-Telecommunications Standardization Sector, Document Q15-I-62 Ninth Meeting: Red Bank, New Jersey, Oct. 19-22, 1999.

ITU-Telecommunications Standardization Sector, Document Q15-H-07 Eighth Meeting: Berlin, Aug. 3-6, 1999.

ITU-Telecommunications Standardization Sector, Document Q15-G-11 Seventh Meeting: Monterey, Feb. 16-19, 1999.

ITU-Telecommunications Standardization Sector, Document Q15-D-17 Fourth Meeting: Tampere, Finland, Apr. 21-24, 1998.

"Robust H.263 Compatible Video Transmission for Mobile Access to Video Servers" by N. Farber et al, 1997 IEEE, pp. 73-76.

"Error Resilience Support in H.263+" Stephan Wenger et al pp. 2-21.

Patent Abstracts of Japan, Abstract of JP 12-165816, Jun. 16, 2000.

Patent Abstract, publication No. JP02078584A2, "Printing Control Method and Device Therefor", Tsukada Masayuki et al.

Patent Abstract, publication No. JP2000188759A2, "High Frame Precision Seamless Splicing Method for Information", Christopher Ward et al.

Patent Abstract, publication No. JP2001119305A2, "Signal Processor", Nicholas Ian Saunders et al.

Patent Abstracts of Japan, publication No. 02154110A, "Water Depth Measuring Device" Yoji Yoshida.

Canadian Office Action (Application No. 2,431,866) dated Dec. 6, 2007 (4 pages).

USPTO Final Office Action in U.S. Appl. No. 10/785,426, dated Jul. 8, 2009 (15 pages).

* cited by examiner

SWITCHING BETWEEN BIT-STREAMS IN VIDEO TRANSMISSION

CROSS-REFERENCE TO RELATED APPLICATIONS

This application is the U.S. National Phase of International Application PCT/FI02/0004 filed Jan. 3, 2002 and published in English on Jul. 11, 2002 under International Publication No. WO 02/054776 A1 which in turn claims priority from U.S. application Ser. No. 09/925,769 filed Aug. 9, 2001, from U.S. application Ser. No. 09/883,887 filed Jun. 18, 2001, from U.S. application Ser. No. 09/827,796 filed Apr. 6, 2001, from U.S. provisional application Ser. No. 60/259,529 filed Jan. 3, 2001.

The present invention relates to a method for transmitting video information, in which at least a first bit-stream and a second bit-stream are formed from the video information, the first bit-stream comprises a first set of frames comprising at least one video frame, and the second bit-stream comprises a second set of frames comprising at least one predictive video frame, at least partly different encoding parameters are used with encoding of the frames of said first bit-stream and said second bit-stream, at least one frame of said first bit-stream is being transmitted, and the transmission is switched over from said first bit-stream to said second bit-stream. The invention also relates to an encoder comprising means for forming at least a first bit-stream and a second bit-stream from a video information, the first bit-stream comprises a first set of frames comprising at lest one video frame, and the second bit-stream comprises a second set of frames comprising at least one predictive video frame, and means for using at least partly different encoding parameters with encoding of the frames of said first bit-stream and said second bit-stream, means for transmitting at least one frame of said first bit-stream, and means for switching the transmission over from said first bit-stream to said second bit-stream. The invention further relates to a decoder for decoding a video information from a signal comprising frames from at least a first bit-stream and a second bit-stream, which are formed from the video information, the first bit-stream comprises a first set of frames comprising at lest one video frame, and the second bit-stream comprises a second set of frames comprising at least one predictive video frame, and at least partly different encoding parameters are used with encoding of the frames of said first bit-stream and said second bit-stream. The invention further relates to a signal representing encoded video information, and comprising frames from at least a first bit-stream and a second bit-stream, which are formed from the video information, the first bit-stream comprises a first set of frames comprising at lest one video frame, and the second bit-stream comprises a second set of frames comprising at least one predictive video frame, at least partly different encoding parameters are used with encoding of the frames of said first bit-stream and said second bit-stream.

BACKGROUND

Recently, multimedia applications that include streaming audio and video information have come into greater use. Several international standardization organizations have established and proposed standards for compressing/encoding and decompressing/decoding the audio and video information. MPEG standards, established by the Motion Picture Expert Group, are the most widely accepted international standards in the field of the multimedia applications. VCEG is the "Video Coding Experts Group", working under the direction of the ITU Telecommunication Standardization Sector (ITU-T). This group works on the standard H.26L for the coding of moving pictures.

A typical video stream comprises a sequence of pictures, often referred to as frames. The frames comprise pixels arranged into a rectangular form. In existing video coding standards, such as H.261, H.262, H.263, H.26L and MPEG-4, three main types of pictures are defined: Intra frames (I-frames), Predictive frames (P-frames) and Bi-directional frames (B-frames). Each picture type exploits a different type of redundancy in a sequence of images and consequently results in different level of compression efficiency and, as explained in the following, provides different functionality within the encoded video sequence. An intra frame is a frame of video data that is coded by exploiting only the spatial correlation of the pixels within the frame itself without using any information from the past or the future frames. Intra frames are used as the basis for decoding/decompression of other frames and provide access points to the coded sequence where decoding can begin.

A predictive frame is a frame that is encoded/compressed using motion compensated prediction from a so-called reference frame, i.e. one or more previous/subsequent Intra frames or Predictive frames available in an encoder or in a decoder. A bi-directional frame is a frame that is encoded/compressed by prediction from a previous Intra frame or Predictive frame and/or a subsequent Intra frame or Predictive frame.

Since adjacent frames in a typical video sequence are highly correlated, higher compression can be achieved when using Bi-directional or Predictive frames instead of Intra frames. On the other hand, when the temporal predictive coding is employed within the coded video stream, B-frames and/or P-frames cannot be decoded without correctly decoding all the other previous and/or subsequent reference frames which were used with coding of the Bi-directional and Predictive frames. In situations in which the reference frame(s) used in the encoder and respective reference frame(s) in the decoder are not identical either due to errors during transmission or due to some intentional action on the transmitting side, the subsequent frames that make use of prediction from such a reference frame can not be reconstructed on the decoding side to yield a decoded frame identical to that originally encoded on the encoding side. This mismatch is not only confined to a single frame but further propagates in time due to the use of motion compensated coding.

FIGS. 1A-1C illustrate the types of encoded/compressed video frames used in a typical video encoding/decoding system. Advantageously, prior to encoding, the pictures of the video sequence are represented by these matrices of multiple-bit numbers, one representing the luminance (brightness) of the image pixels, and the other two each representing a respective one of two chrominance (colour) components. FIG. 1A depicts the way in which an Intra frame 200 is encoded using only image information present in the frame itself. FIG. 1B illustrates construction of a Predictive frame 210. Arrow 205a represents the use of motion compensated prediction to create the P-frame 210. FIG. 1C depicts construction of Bi-directional frames 220. B-frames are usually inserted between I-frames or P-frames. FIG. 2 represents a group of pictures in display order and illustrates how B-frames inserted between I- and P-frames, as well as showing the direction in which motion compensation information flows. In FIGS. 1B, 1C and 2, arrows 205a depict forward motion compensation prediction information necessary to reconstruct P-frames 210, whereas arrows 215a and 215b depict motion compensation information used in reconstructing B-frames 220 in forward direction (215a) and backward direction (215b). In other words, the arrows 205a and 215a show the flow of information when predictive frames are predicted from frames that are earlier in display order than the frame being reconstructed, and arrows 215b show the flow of information when predictive frames are predicted from frames that are later in display order than the frame being reconstructed.

In motion compensated prediction, the similarity between successive frames in a video sequence is utilized to improve coding efficiency. More specifically, so-called motion vectors are used to describe the way in which pixels or regions of pixels move between successive frames of the sequence. The motion vectors provide offset values and error data that refer to a past or a future frame of video data having decoded pixel values that may be used with the error data to compress/encode or decompress/decode a given frame of video data.

The capability to decode/decompress P-frames requires the availability of the previous I- or P-reference frame, furthermore in order to decode a B-frame requires the availability of the subsequent I- or P-reference frame is also required. For example, if an encoded/compressed data stream has the following frame sequence or display order:

$$I_1B_2B_3P_4B_5P_6B_7P_8B_9B_{10}P_{11} \ldots P_{n-3}B_{n-2}P_{n-1}I_n,$$

the corresponding decoding order is:

$$I_1P_4B_2B_3P_6B_5P_8B_7P_{11}B_9B_{10} \ldots P_{n-1}B_{n-2}I_n.$$

The decoding order differs from the display order because the B-frames require future I- or P-frames for their decoding. FIG. 2 displays the beginning of the above frame sequence and can be referred to in order to understand the dependencies of the frames, as described earlier. P-frames require the previous I- or P-reference frame be available. For example, $P_4$ requires $I_1$ to be decoded. Similarly, frame $P_6$ requires that $P_4$ be available in order to decode/decompress frame $P_6$. B-frames, such as frame $B_3$, require a past and/or a future I- or P-reference frame, such as $P_4$ and $I_1$ in order to be decoded. B-frames are frames between I- or P-frames during encoding.

A prior art system for encoding and decoding is shown in FIGS. 3 and 4. Referring to the encoder 300 of FIG. 3, the frame 301 being coded I(x,y), called the current frame, is partitioned into rectangular regions of KxL pixels. The coordinates (x,y) denote the location of the pixels within the frame. Each block is encoded using either intra coding (i.e. using only the spatial correlation of the image data within the block) or inter coding (i.e. utilising both spatial and temporal prediction). The following description considers the process by which inter-coded blocks are formed. Each inter-coded block is predicted 360 from one of the previously (or subsequently) coded and transmitted frames R(x,y) in the frame memory 350, called a reference frame. The motion information used for the prediction is obtained from motion estimation and coding block 370 by using the reference frame and the current frame 305. The motion information is represented by a two-dimensional motion vector ($\Delta x$, $\Delta y$) where $\Delta x$ is a horizontal and $\Delta y$ is a vertical displacement. In the motion compensated (MC) prediction block, the motion vectors are used together with the reference frame to construct prediction frame P(x,y):

$$P(x,y)=R(x+\Delta x,y+\Delta y).$$

Subsequently the prediction error E(x,y), i.e. the difference between the current frame and the prediction frame P(x,y), is calculated 307 according to $$E(x,y)=I(x,y)-P(x,y).$$

In transform block 310, the prediction error for each KxL block is represented as weighted sum of a transform basis functions $f_{i,j}(x,y)$, $$E(x, y) = \sum_{i=1}^{K} \sum_{j=1}^{L} c_{err}(i, j) f_{i,j}(x, y).$$

The weights $c_{err}(i,j)$ corresponding to the basis functions are called transform coefficients. These coefficients are subsequently quantised in quantisation block 320 to give $$I_{err}(i,j)=Q(c_{err}(i,j),QP)$$

where $I_{err}(i,j)$ are the quantised transform coefficients. The quantisation operation Q( ) introduces loss of information, but the quantised coefficients can be represented with smaller number of bits. The level of compression (loss of information) is controlled by adjusting the value of the quantisation parameter QP.

Before the motion vectors and quantised transform coefficients are supplied to the multiplexer 380, they are further encoded using Variable Length Codes (VLC). This reduces the number of bits needed to represent the motion vectors and quantised transform coefficients. The encoded motion vectors, quantised transform coefficients as well as other additional information needed to represent each coded frame is multiplexed in the multiplexer 380, and the resulting bit-stream is transmitted 415 to the decoder. The quantised transform coefficients are also forwarded to the inverse quantisation block 330 to obtain inverse quantised transform coefficients and further to the inverse transform block 340 to obtain the prediction error information $E_c(x,y)$ for the current frame. The prediction error information $E_c(x,y)$ is added to the predicted frame P(x,y) in a summing element to obtain a video frame that can be subsequently stored in the frame memory 350.

In the following, decoding video frames will be described with reference to FIG. 4. The decoder 400 receives the multiplexed video bit-stream 415 from the encoder, and the demultiplexer 410 demultiplexes the bit-stream to obtain the constituent parts of the video frames to be decoded. These parts comprise at least the coded quantised prediction error transform coefficients and the coded motion vectors, which are subsequently decoded (not shown) to obtain quantised prediction error transform coefficients and motion vectors. The quantised transform coefficients are inverse quantised in inverse quantisation block 420 to obtain inverse quantised transform coefficients $d_{err}(i,j)$ according to the following relation:

$$d_{err}(i,j)=Q^{-1}(I_{err}(i,j),QP).$$

In inverse transform block 430, the inverse quantised transform coefficients are subjected to an inverse transform to obtain prediction error $E_c(x,y)$:

$$E_c(x, y) = \sum_{i=1}^{K} \sum_{j=1}^{L} c_{err}(i, j) f_{i,j}(x, y).$$

The pixels of the current coded frame are reconstructed by finding the prediction pixels in the reference frame R(x,y) obtained from frame memory 440, and using the received motion vectors together with the reference frame in motion compensation prediction block 450, to obtain a predicted frame P(x,y). The predicted frame P(x,y) and the prediction error information $E_c(x,y)$ are summed together in a summing element 435 according to the following relation:

$$I_c(x,y)=R(x+\Delta x, y+\Delta y)+E_c(x,y).$$

These values $I_c(x,y)$ can further be filtered to obtain decoded video frames 445. The values $I_c(x,y)$ are also stored in the frame buffer 440. The reconstructed values $I_c(x,y)$ can be filtered in a filtering block (not shown in FIG. 4) after the summation block 435.

Video streaming has emerged as an important application in the fixed Internet. It is further anticipated that video streaming will also be important in and in the near future in 3G wireless networks. In streaming applications the transmitting server starts transmitting a pre-encoded video bit stream via a transmission network to a receiver upon a request from the receiver. The receiver plays back the video stream back while receiving it. The best-effort nature of present networks causes variations in the effective bandwidth available to a user due to the changing network conditions. To accommodate these variations, the transmitting server can scale the bit rate of the compressed video. In the case of a conversational service characterized by real-time encoding and point-to-point delivery, this can be achieved by adjusting the source encoding parameters on the fly. Such adjustable parameters can be, for example, a quantisation parameter, or a frame rate. The adjustment is advantageously based on feedback from the transmission network. In typical streaming scenarios when a previously encoded video bit stream is to be transmitted to the receiver, the above solution cannot be applied.

One solution to achieve bandwidth scalability in case of pre-encoded sequences is to produce multiple and independent streams having different bit-rates and quality. The transmitting server then dynamically switches between the streams to accommodate variations in the available bandwidth. The following example illustrates this principle. Let us assume that multiple bit streams are generated independently with different encoding parameters, such as quantisation parameter, corresponding to the same video sequence. Let $\{P_{1,n-1}, P_{1,n}, P_{1,n+1}\}$ and $\{P_{2,n-1}, P_{2,n}, P_{2,n+1}\}$ denote the sequence of decoded frames from bit streams 1 and 2, respectively. Since the encoding parameters are different for the two bit streams, frames reconstructed from them at the same time instant, for example, frames $P_{1,n-1}$ and $P_{2,n-1}$, are not identical. If it is now assumed that the server initially sends encoded frames from bit stream 1 up to time n after which it starts sending encoded frames from bit stream 2, the decoder receives frames $\{P_{1,n-2}, P_{1,n-1}, P_{2,n}, P_{2,n+1}, P_{2,n+2}\}$. In this case $P_{2,n}$ cannot be correctly decoded since its reference frame $P_{2,n-1}$ is not received. On the other hand, the frame $P_{1,n-1}$, which is received instead of $P_{2,n-1}$, is not identical to $P_{2,n-1}$. Therefore switching between bit streams at arbitrary locations leads to visual artefacts due to the mismatch between the reference frames used for motion compensated prediction in the different sequences. These visual artefacts are not only confined to the frame at the switching point between bit streams, but propagates in time due to the continued motion compensated coding in the remaining part of the video sequence.

In current video encoding standards, perfect (mismatch-free) switching between bit streams is only possible at positions where the current and future frames or regions thereof do not use any information previous to the current switching location, i.e., at I-frames. Furthermore, by placing I-frames at fixed (e.g. 1 sec) intervals, VCR functionalities, such as random access or "Fast Forward" and "Fast Backward" (increased playback rate) for streaming video content, are achieved. The user may skip a portion of the video sequence and restart playing at any I-frame location. Similarly, an increased playback rate can be achieved by transmitting only I-frames. The drawback of using I-frames in these applications is that since I-frames do not exploit any temporal redundancy they require a much larger number of bits than P-frames at the same quality.

SUMMARY OF THE INVENTION

It is an aim of the present invention to provide a new method and a system for transmitting video images in variable transmission environments. The invention is based on the idea that correct (mismatch-free) switching between video streams is enabled by forming a new type of a compressed video frame and inserting frames of the new type into video bit-streams at locations where switching from one bit-stream to another is to be allowed. In this description, the new type of compressed video frame will be referred to generally as an S-frame. More specifically, S-frames may be classified as SP-frames, which are formed at the decoder using motion compensated prediction from already decoded frames using motion vector information, and SI-frames, which are formed at the decoder using spatial (intra) prediction from already decoded neighbouring pixels within a frame being decoded. In general, an S-frame according to the invention is formed on a block-by-block basis and may comprise both inter-coded (SP) blocks as well as intra-coded (SI) blocks. The method according to the present invention is primarily characterized in that in switching the transmission over from said first bit-stream to said second bit-stream, the secondary bit-stream comprises at least one primary switching frame, a secondary switching frame is transmitted, the secondary switching frame having been encoded using the encoding parameters of the second bit-stream and at least one reference frame from the first bit-stream, and said secondary switching frame is used in place of the primary switching frame as a reference frame to be used in the reconstruction of said at least one predictive video frame of the second set of video frames. The encoder according to the present invention is primarily characterized in that said means for switching the transmission over from said first bit-stream to said second bit-stream comprise means for encoding a secondary switching frame using the encoding parameters of the second bit-stream and reference frames from the first bit-stream to enable to switch the transmission over from said first bit-stream to said second bit-stream. The decoder according to the present invention is primarily characterized in that the decoder comprises means for decoding a secondary switching frame, said secondary switching frame having been encoded using the encoding parameters of the second bit-stream and at least one reference frame from the first bit-stream, and added to said signal in place of a primary switching frame as a reference frame to be used in the reconstruction of said at least one predictive video frame of the second set of video frames, and that said means for decoding a secondary switching frame comprise means for using decoding parameters of the second bit-stream and reference frames from the first bit-stream. The signal according to the present invention is primarily characterized in that in switching the transmission over from said first bit-stream to said second bit-stream, the secondary bit-stream comprises at least one primary switching frame, said signal comprises a secondary switching frame having been encoded using the encoding parameters of the second bit-stream and at least one reference frame from the first bit-stream, and said secondary switching frame is in place of the primary switching frame as a reference frame to be used in the reconstruction of said at least one predictive video frame of the second set of video frames.

Considerable advantages are achieved by the present invention compared to the methods and systems of prior art. The invention allows switching between bit streams to occur not only at the locations of I-frames but also at the locations of the SP-frames. The coding efficiency of an SP-frame is much better than the coding efficiency of a typical I-frame wherein less bandwidth is needed to transmit bit streams having SP-frames in locations where, according to prior art, I-frames would be used, while still providing enough adaptability to changing transmission conditions. The switching of one bit stream into another can be performed at locations in which an SP-frame according to the invention is placed in the encoded bit stream. The images reconstructed from the bit stream by the decoder is not degraded as a result of changing from one bit stream to another. The invention also has the advantage that random access, fast-forward and fast rewind operations can be performed on the bit stream. The system according to the invention offers improved error recovery and resiliency properties compared with the described prior art solutions.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the following the invention will be described in more detail with reference to the appended drawings, in which.

DETAILED DESCRIPTION OF THE INVENTION

In the following the invention is described in a system in which multiple bit streams are formed from a video signal. The video signal can be any digital video signal comprising multiple images, i.e. an image sequence. The digital video signal is encoded in an encoder to form multiple bit streams. Each bit stream is encoded from the same video signal using at least partly different encoding parameters. For example, the bit rate can be altered by selecting the encoding parameters differently, and in this way bit streams with different bit rates can be formed. The encoding parameters can be, for example, frame rate, quantisation parameter, spatial resolution, or another factor affecting the images size, known as such to a person skilled in the art. The encoder also inserts at least one Intra frame to each bit stream. Typically, at least the first frame of each bit stream is preferably an Intra frame. This enables the decoder to start reconstruction of the video signal. The encoder used in the encoding of the I-frames, P-frames and B-frames can be any prior art encoder which performs the encoding of the video signal, or there may exist more than one prior art encoder each using different encoding parameters to form multiple bit streams. However, to encode a video signal containing also SP-frames and/or SI-frames according to the invention, new functionality is needed in the encoder. This will be explained later in greater detail.

The encoder also inserts frames encoded using motion compensated predictive coding (P-frames and optionally B-frames) into the bit streams. The encoder also inserts a new type of frames, referred to as S-frames in this description, into each bit stream at locations where switching between different bit streams will be allowed according to the invention. The S-frames may be used at locations where in prior art methods an Intra coded frame would be inserted, or the S-frames may be used in addition to using Intra coded frames in the video sequence. Advantageously, the different bit streams are stored into storage means for later use. However, it is also possible that transmission may take place substantially immediately after encoding wherein it is not necessary to store complete video sequences, but storing the necessary reference frames suffices. Transmission of the encoded video stream may be performed e.g. by a transmitting server, which has means for retrieving the stored bit streams for transmission, and/or means for receiving the bit streams directly from the encoder. The transmitting server also has means for transmitting the bit stream to the transmission network (not shown).

Figure 1A:
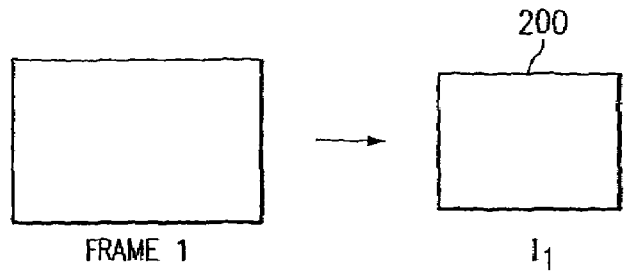
FIGS. 1A-1C and 2 are diagrams showing the prior art encoding/compression of video frames.
Figure 1B:
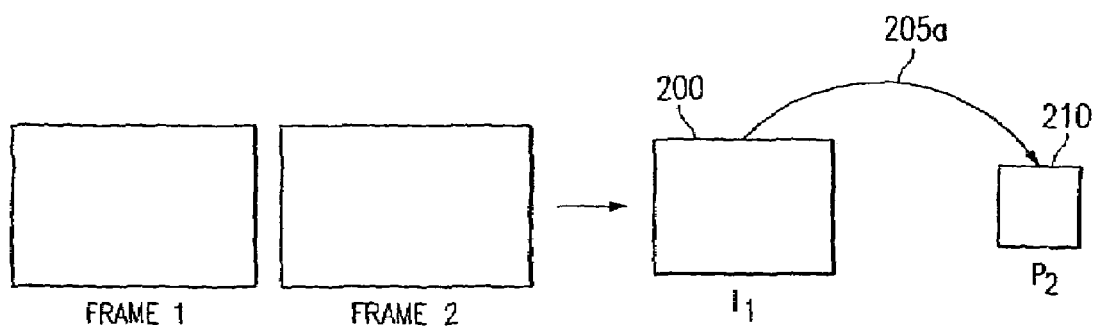
Figure 1C:
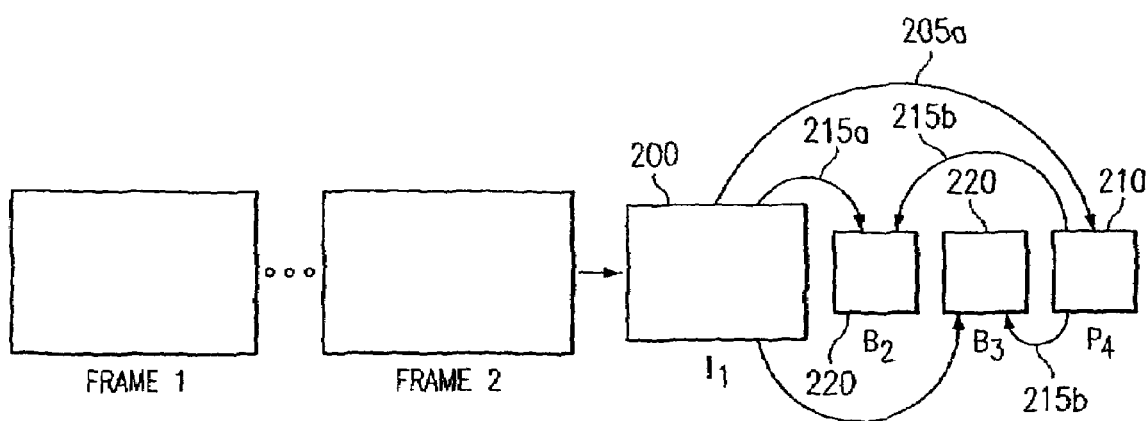
Figure 2:
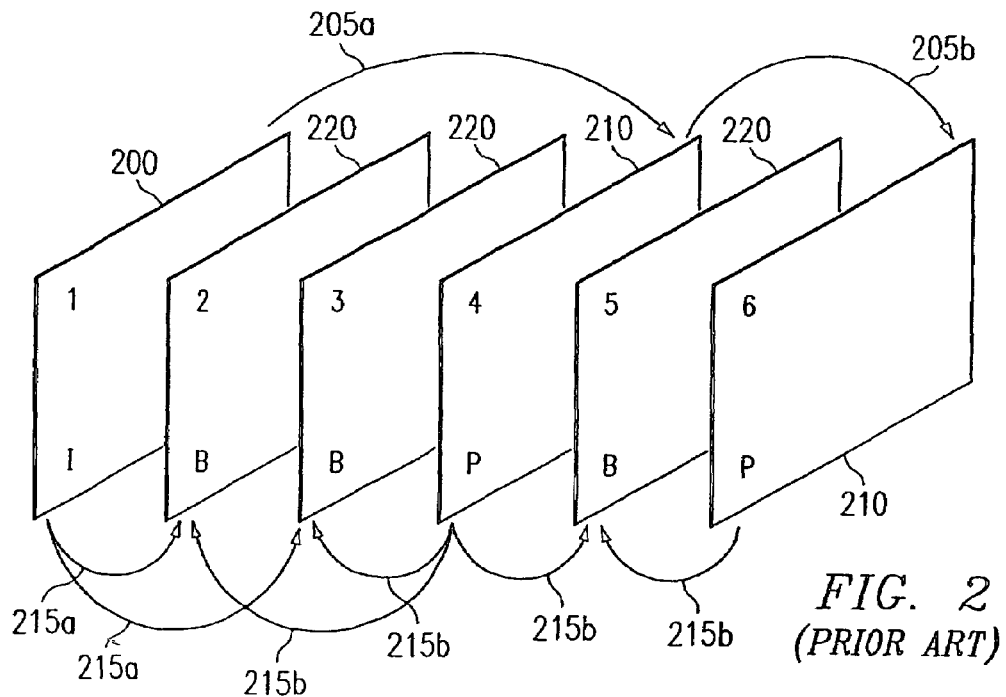
Figure 3:
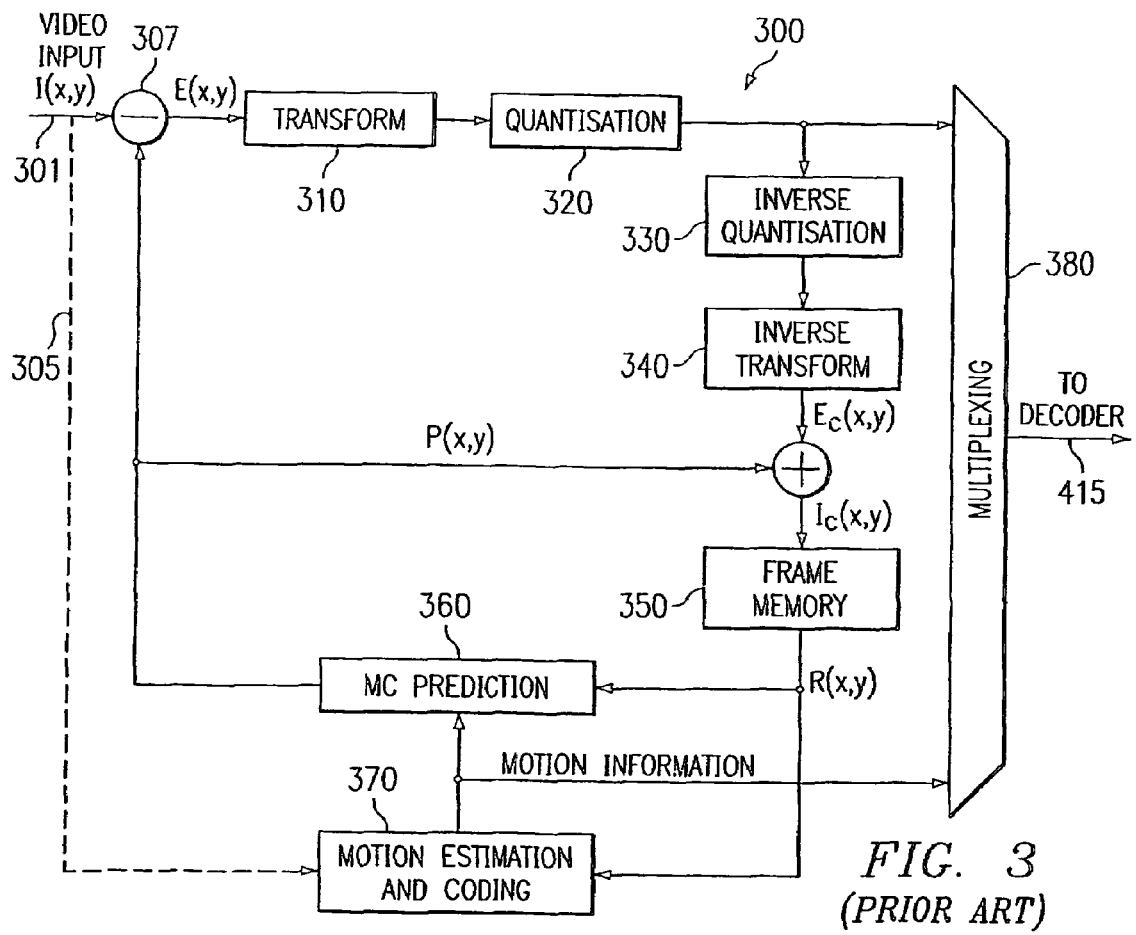
FIG. 3 is a block diagram of a generic motion-compensated predictive video coding system (encoder)
Figure 4:
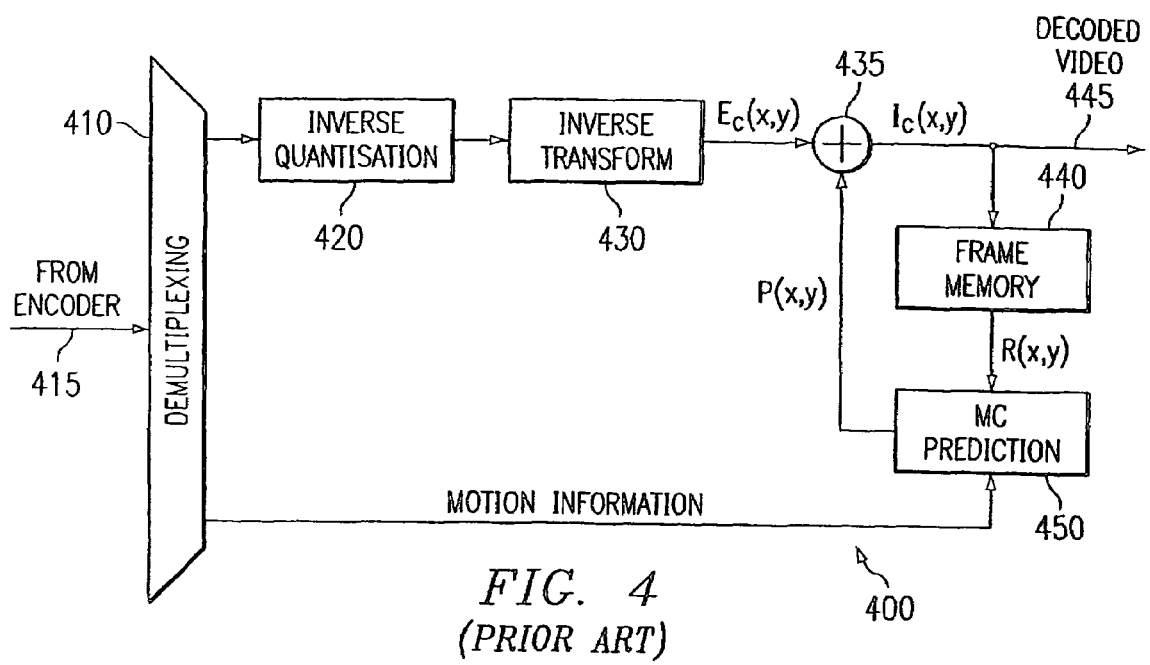
FIG. 4 is a block diagram of a generic motion-compensated predictive video coding system (decoder)
Figure 5:
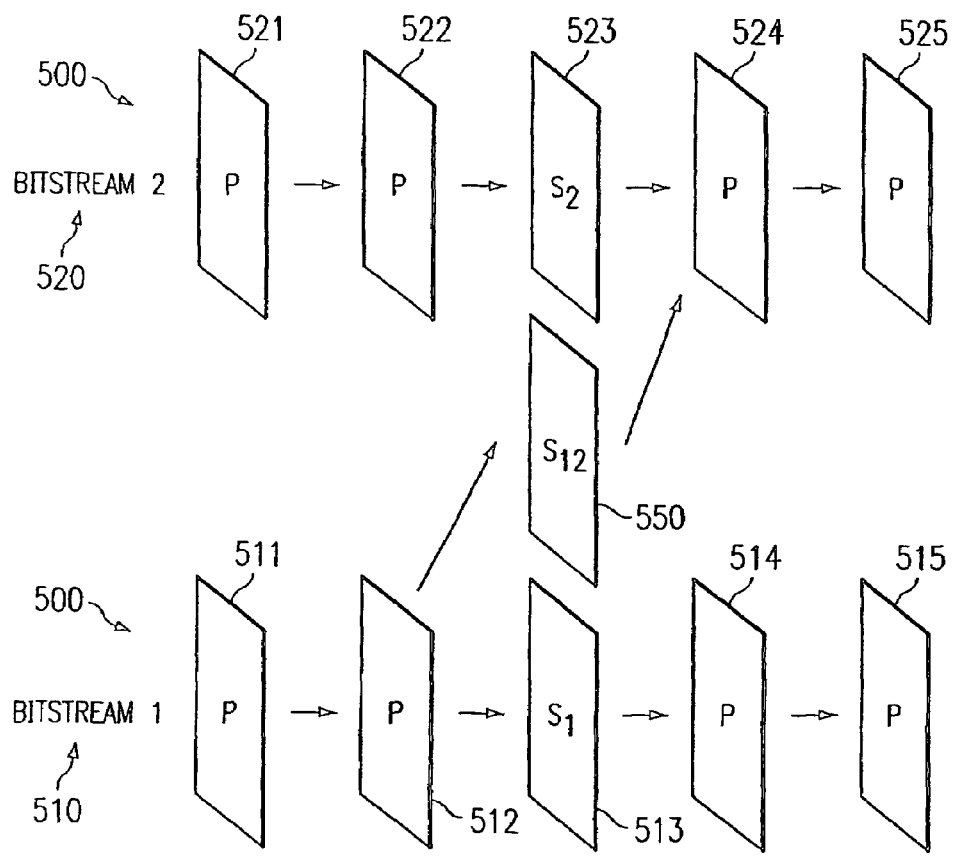
FIG. 5 is an illustration showing switching between two different bit streams using S-frames according to the invention.

In the following, a method according to an advantageous embodiment of the invention will be described. FIG. 5 depicts part of a first bit stream 510 and part of a second bit stream 520, which are formed in the encoder. Only a few P-frames of the respective bit streams are shown. Specifically, the first bit stream 510 is shown to comprise P-frames 511, 512, 514 and 515, while the second bit stream 520 comprises corresponding P-frames 521, 522, 524 and 525. Both the first bit stream 510 and the second bit stream 520 also comprise S-frames 513 (also labelled $S_1$), 523 (also labelled $S_2$) at corresponding locations. It is assumed that the two bit streams 510 and 520 correspond to the same sequence encoded at different bit rates for example by using different frame rates, different spatial resolutions or different quantisation parameters. It is further assumed that the first bit stream 510 is being transmitted from the transmitting server to a decoder 600, 1200, 1300 (FIGS. 6, 12 and 13, respectively) via a transmission network, and that the transmitting server receives a request from the transmission network to change the bit rate of the video stream being transmitted.

As mentioned above, S-frames are placed in the bit stream during the encoding process at those locations within the video sequences where switching from one bit stream to another is allowed. As can be seen from FIG. 5, in an advantageous embodiment of the invention a further S-frame 550 (also labelled $S_{12}$) is associated with S-frames $S_1$ and $S_2$. This S-frame is called a secondary representation of the S-frame frame (or secondary S-frame for short), and is only transmitted during bit stream switching. This secondary S-frame $S_{12}$ is generated by a special encoding of the $n^{th}$ frame in the video sequence using the encoding parameters of the corresponding S-frame 523 ($S_2$) in the second bit stream 520 and using motion compensated prediction from the reference frames of the $n^{th}$ frame in the first bit stream 510. It should be noted that in the situation shown in FIG. 5, S-frame $S_2$ uses the previously reconstructed frames from the second bit stream 520 as reference frames and the secondary S-frame $S_{12}$ uses the previously reconstructed frames from the first bit stream 510 as reference frames. However, the reconstructed pixel values of both $S_2$ and $S_{12}$ are identical. S-frame $S_{12}$ is transmitted only when switching from the first bit stream 510 to the second bit stream 520 is actually performed. Therefore it is not necessary to form the secondary S-frames during the encoding phase but only when switching is performed. On the other hand, it may be useful to have at least some secondary S-frames formed earlier at the time when the different bit streams are formed to reduce computational load during transmission.

When the transmitting server reaches the frame of the video sequence encoded as S-frame 513 ($S_1$) in the first bit stream 510, it can begin the necessary operations to continue transmission of the video stream using the encoded frames of the second bit stream 520. At that point the transmitting server has already transmitted P-frames 511 and 512 from the first bit stream 510 and the decoder 600, 1200, 1300 has received and decoded the respective P-frames 511, 512. Thus, those frames have already been stored in the frame memory 640, 1250, 1360 of the decoder 600, 1200, 1300. The frame memory 640, 1250, 1360 comprises sufficient memory to store all those frames, which are needed to reconstruct a P-frame or a B-frame, i.e. the necessary information of all the reference frames required by the current frame to be reconstructed.

The transmitting server performs the following operations to continue the transmission of the video stream using the encoded frames of the second bit stream 520. The transmitting server notices, for example, by examining the type information of the frame, that the current frame to be transmitted is an S-frame, so it is possible to perform switching between the bit streams. Of course, switching is only performed if a request to do so has been received or there is for some other reason a need to perform the switch. The transmitting server inputs the corresponding S-frame 523 of the second bit stream, uses it to form the secondary S-frame 550 ($S_{12}$), and transmits the secondary S-frame ($S_{12}$) to the decoder 600, 1200, 1300. The transmitting server does not transmit the S-frame $S_2$ of the second bit stream, but sends the secondary S-frame $S_{12}$ in its place. The secondary S-frame is formed in such a way that by decoding the secondary S-frame $S_{12}$ the decoder 600 can reconstruct an image identical to that which would be produced if it were using respective frames 521, 522 and the S-frame 523 of the second bit stream 520. After the transmission of the secondary S-frame the transmitting server continues to transmit the encoded frames if the second bit stream 520, i.e., 524, 525, and so on.

The S-frame 513, 523, 550 can comprise blocks encoded using only spatial correlation among the pixels (intra blocks) and blocks encoded using both spatial and temporal correlation (inter blocks). For each inter block the prediction of this block, P(x,y), is formed in the decoder 600, 1200, 1300 using received motion vectors and a reference frame. The transform coefficients $c_{pred}$ for P(x,y) corresponding to basis functions $f_{ij}(x,y)$ are calculated and quantised. The quantised values of the transform coefficients $c_{pred}$ are denoted as $I_{pred}$ and the dequantised values of the quantised transform coefficients $I_{pred}$ are denoted as $d_{pred}$. Quantised coefficients $I_{err}$ for the prediction error are received from the encoder. The dequantised values of these coefficients will be denoted as $d_{err}$. Value of each pixel S(x,y) in the inter block is decoded as a weighted sum of the basis functions $f_{ij}(x,y)$ where the weight values $d_{rec}$ will be called dequantised reconstruction image coefficients. The values of $d_{rec}$ have to be such that coefficients $c_{rec}$ exist from which by quantisation and dequantisation $d_{rec}$ can be obtained. In addition, values $d_{rec}$ have to fulfill one of the following conditions:

$$d_{rec}=d_{pred}+d_{err}, \text{or}$$

$$c_{rec}=c_{pred}+d_{err}.$$

Values S(x,y) can further be normalized and filtered.

Next, encoding of the S-frames placed within the bit stream, e.g. S-frames 513 ($S_1$) and 523 ($S_2$) is described.

Generally, an S-frame according to the invention such as frames 513, 523 in FIG. 5 is constructed on a block-by-block basis. As explained earlier, each of the blocks may be coded either in such a way as to take advantage of the spatial correlations among pixels of the image being coded (intra or SI-blocks) or in such a way as to take advantage of the temporal correlation between blocks of pixels in successive frames of a video sequence (inter or SP-blocks).

The encoding of S-frames according to the invention will be described with reference to FIG. 11 which is a block diagram of an S-frame encoder 1100 according to a first embodiment of the invention.

A video frame to be encoded in S-frame format is first partitioned into blocks and each block is then encoded as either an SP-block, an SI-block, or an intra-block, an intra-block being known as such from prior art. Switch 1190 is operated as appropriate to switch between the SI and SP encoding modes, i.e., the switch 1190 is a construction used in the description of the invention, not necessarily a physical device. In SP-encoding mode switch 1190 is operated to obtain a motion compensated prediction for the current block 1170. Motion compensated prediction block 1170 forms a prediction P(x,y) for the current block of the frame being encoded in a manner analogous to that used in motion compensated prediction known from prior art. More specifically, motion compensated prediction block 1170 forms the prediction P(x,y) for the current block of the frame being encoded by determining a motion vector describing the relationship between the pixels in the current block and pixel values of a reconstructed reference frame held in frame memory 1146.

In SI-encoding mode switch 1190 is operated to obtain a prediction for the current block of the frame being coded from intra prediction block 1180. Intra prediction block 1180 forms the prediction P(x,y) for the current block of the frame being encoded in a manner analogous to that used in intra prediction known from prior art. More specifically, intra prediction block 1180 forms the prediction P(x,y) for the current block of the frame being encoded using spatial prediction from already encoded neighbouring pixels within the frame being encoded.

In both SP- and SI-coding modes the prediction P(x,y) takes the form of a block of pixel values. A forward transform, for example a Discrete Cosine Transform (DCT), is applied to the predicted block of pixel values P(x,y) in block 1160 and the resulting transform coefficients, referred to as $c_{pred}$, are subsequently quantised in quantisation block 1150 to form quantised transform coefficients $I_{pred}$. Corresponding operations are also performed on the original image data. More specifically, the current block of pixel values of the original image being encoded is applied to transform block 1110. Here, a forward transform (e.g., a DCT) is applied to the pixel values of the original image block to form transform coefficients $c_{orig}$. These transform coefficients are passed to quantisation block 1120 where they are quantised to form quantised transform coefficients $I_{orig}$. The summing element 1130 receives both sets of quantised transform coefficients $I_{pred}$ and $I_{orig}$ from the respective quantisation blocks 1150 and 1120 and generates a set of quantised prediction error coefficients $I_{err}$ according to the relationship:

$$I_{err} = I_{orig} - I_{pred}.$$

The quantised prediction error coefficients $I_{err}$ are passed to multiplexer 1135. If the current block is encoded in SP-format/mode, multiplexer 1135 also receives the motion vectors for the SP-coded block. If the current block is encoded in SI-format/mode, information concerning the intra prediction mode used to form the prediction for the SI-coded block in intra prediction block 1180 is passed to the multiplexer. Advantageously, variable length coding is applied to the quantised prediction error coefficients $I_{err}$ and to the motion vector or intra prediction mode information in the multiplexer 1135, a bit-stream is formed by multiplexing together the various forms of information and the bit-stream thus formed is transmitted to a corresponding decoder 1200, 1300 (see FIGS. 12 and 13).

The S-frame encoder 1100 according to the invention also comprises local decoding functionality. The quantised prediction transform coefficients $I_{pred}$ formed in quantisation block 1150 are supplied to the summing element 1140 which also receives the quantisation error coefficients $I_{err}$. The summing element 1140 recombines the quantised prediction transform coefficients $I_{pred}$ and the quantised prediction error coefficients $I_{err}$ to form a set of reconstructed quantised transform coefficients $I_{rec}$ according to the relationship:

$$I_{rec} = I_{pred} + I_{err}.$$

The reconstructed quantised transform coefficients are passed to inverse quantisation block 1142 which inverse quantises the reconstructed quantised transform coefficients to form inverse quantised reconstructed transform coefficients $d_{rec}$. The inverse quantised reconstructed transform coefficients are further passed to inverse transform block 1144 where they are subjected to e.g. an Inverse Discrete Cosine Transform (IDCT), or any other inverse transform corresponding to the transform performed in block 1160. As a result, a block of reconstructed pixel values is formed for the image block in question and is stored in frame memory 1146. As subsequent blocks of the frame being encoded in S-frame format undergo the previously described encoding and local decoding operations, a decoded version of the current frame is progressively assembled in the frame memory from where it can be accessed and used in intra prediction of subsequent blocks of the same frame or in inter (motion compensated) prediction of subsequent frames in the video sequence. Operation of a generic S-frame decoder according to a first embodiment of the invention will now be described with reference to FIG. 12.

Figure 11:
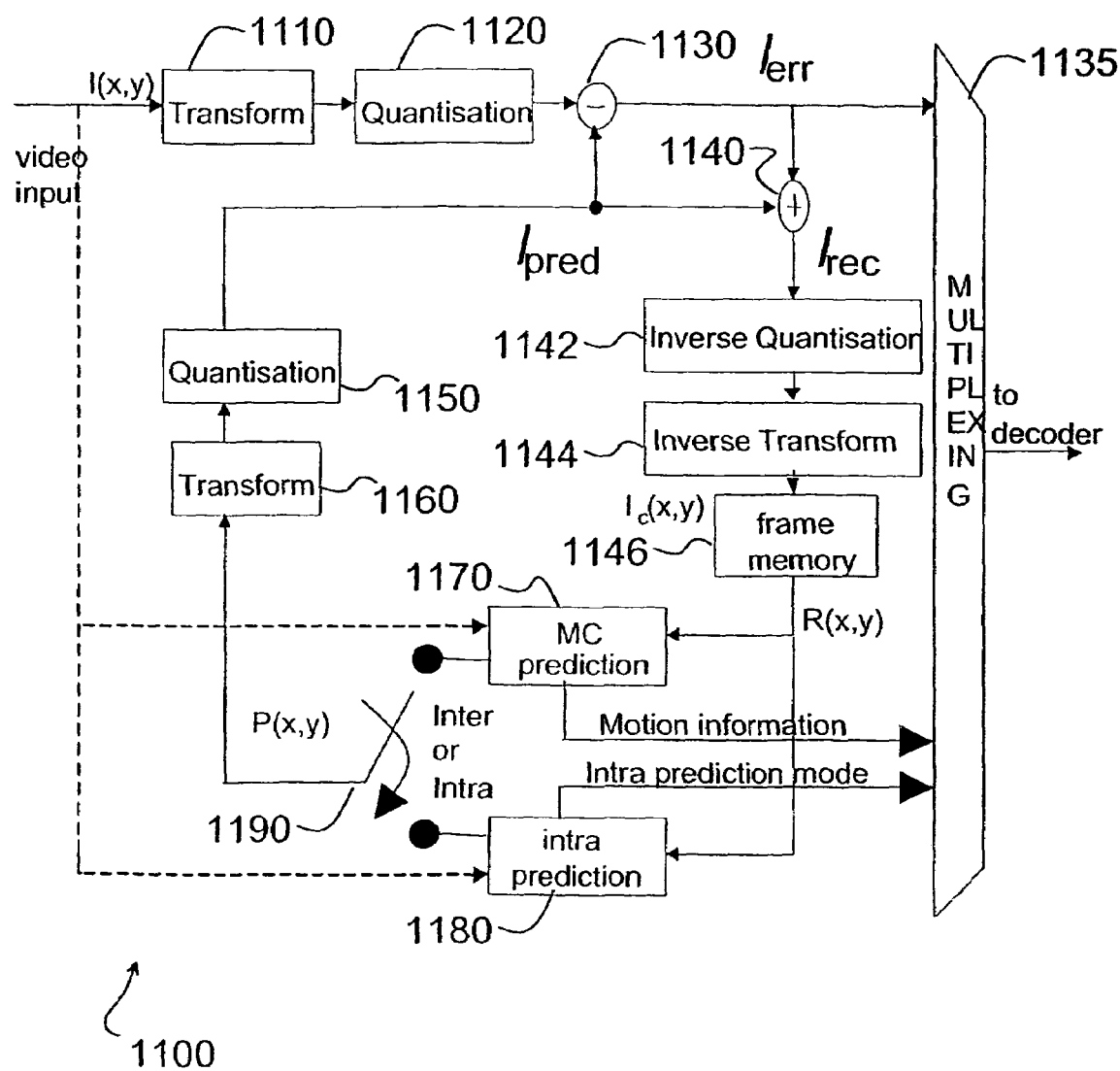
FIG. 11 is a block diagram of an encoder in accordance with an advantageous embodiment of the invention.

The bit-stream generated by the S-frame encoder previously described in connection with FIG. 11 is received by decoder 1200 and is demultiplexed into its constituent parts by demultiplexer 1210. The decoder reconstructs a decoded version of the S-frame on a block-by-block basis. As previously described, an S-frame may comprise intra-blocks, SP-coded and SI-coded image blocks. For SP-format image blocks, the information in the received bit-stream comprises VLC encoded motion coefficient information and VLC encoded quantised prediction error coefficients $I_{err}$. For image blocks encoded in SI-format the information in the received bit-stream comprises VLC coded information relating to the intra prediction mode used to form the intra prediction for the SI-coded block together with VLC coded quantised prediction error coefficients $I_{err}$.

When decoding an SP-coded block, demultiplexer 1210 first applies appropriate variable length decoding (VLD) to the received bit-stream to recover the motion vector information and quantised prediction error coefficients $I_{err}$. It then separates the motion vector information from the quantised prediction error coefficients $I_{err}$. The motion vector information is supplied to motion compensated prediction block 1260 and the quantised prediction error coefficients recovered from the bit-stream are applied to one input of summing element 1220. The motion vector information is used in motion compensated prediction block 1260 together with pixel values of a previously reconstructed frame held in frame memory 1250 to form a prediction P(x,y) in a manner analogous to that employed in the encoder 1100.

When decoding an SI-coded block, demultiplexer 1210 applies appropriate variable length decoding to the received intra prediction mode information and the quantised prediction error coefficients $I_{err}$. The intra prediction mode information is then separated from the quantised prediction error coefficients and supplied to intra prediction block 1270. The quantised prediction error coefficients $I_{err}$ are supplied to one input of the summing element 1220. The intra prediction mode information is used in intra prediction block 1270 in conjunction with previously decoded pixel values of the current frame held in frame memory 1250 to form a prediction P(x,y) for the current block being decoded. Again, the intra prediction process performed in decoder 1200 is analogous to that performed in encoder 1100 and previously described.

Once a prediction for the current block of the frame being decoded has been formed, switch 1280 is operated so that the prediction P(x,y) which comprises predicted pixel values is supplied to transform block 1290. Again, switch 1280 is an abstract construction used in the description of the invention, not necessarily a physical device. In the case of an SP-coded block, switch 1280 is operated to connect motion compensated prediction block 1260 to transform block 1290, while in the case of an SI-coded block it is operated to connect intra prediction block 1270 to transform block 1290.

In block 1290, a forward transform, e.g., a Discrete Cosine transform (DCT), is applied to the predicted block of pixel values P(x,y) and the resulting transform coefficients $c_{pred}$ are supplied to quantisation block 1295 where they are quantised to form quantised transform coefficients $I_{pred}$. Quantised transform coefficients $I_{pred}$ are then supplied to the second input of summing element 1220 where they are added to the prediction error coefficients $I_{err}$ to form reconstructed quantised transform coefficients $I_{rec}$ according to the relationship:

$$I_{rec} = I_{pred} + I_{err}.$$

The reconstructed quantised transform coefficients $I_{rec}$ are further supplied to inverse quantisation block 1230 where they are inverse quantised to form inverse quantised reconstructed transform coefficients $d_{rec}$. The inverse quantised transform coefficients $d_{rec}$ are then passed to inverse transform block 1240 where they are subjected to e.g. an Inverse Discrete Cosine Transform (IDCT), or any other inverse transform corresponding to the transform performed in block 1290. In this way, a block of reconstructed pixel values is formed for the image block in question. The reconstructed pixel values are supplied to the video output and to frame memory 1250. As subsequent blocks of the S-frame being decoded undergo the previously described decoding operations, a decoded version of the current frame is progressively assembled in frame memory 1250 from where it can be accessed and used in the intra prediction of subsequent blocks of the same frame or in the inter (motion compensated) prediction of subsequent frames in the video sequence.

Having reviewed the structure and function of an S-frame encoder and decoder according to a first embodiment of the invention, it is now possible to understand how S-frames according to the invention make it possible to switch between bit-streams without mismatch errors such as those encountered in prior video encoding/decoding systems. Referring once more to the bit-stream switching example depicted in FIG. 5, switching from the first bit-stream 510 to the second bit-stream 520 occurs at the location of S-frames $S_1$ (513) and $S_2$ (523) in the respective bit-streams. As previously noted, when switching is performed, a secondary S-frame, denoted $S_{12}$ (550) is encoded and transmitted. The secondary S-frame $S_{12}$ is encoded using the encoding parameters of the second bit-stream 520 and reference frames from the first bit-stream 510 in such a way that when the secondary frame $S_{12}$ is decoded its reconstructed pixel values are identical to those otherwise resultant, i.e., that would have resulted from transmission of frame $S_2$ in the second bit-stream.

Let $I^2_{err}$ and $I^2_{pred}$ denote the quantised coefficients of the prediction error and the prediction frame, respectively, obtained from encoding of the SP-frame $S_2$ with the procedure described above, and let $I^2_{rec}$ denote the quantised reconstructed image coefficients of the S-frame $S_2$. The encoding of the secondary S-frame 550 ($S_{12}$) follows the same procedures as in the encoding of the S-frame 523 ($S_2$) with the following exceptions: 1) The reference frame(s) used in the prediction of each block of the secondary S-frame $S_{12}$ are the reconstructed frames obtained by decoding the first bit stream 510 up to the current $n^{th}$ frame in the video sequence, 2) The quantised prediction error coefficients are calculated as follows: $I^{12}_{err} = I^2_{rec} - I^{12}_{pred}$ where $I^{12}_{pred}$ denotes the quantised prediction transform coefficients. The quantised prediction error coefficients $I^{12}_{err}$ and the motion vectors are transmitted to the decoder 1200.

When decoding the secondary S-frame $S_{12}$ in the decoder 1200 using the reconstructed frames from the first bit stream 510 before the switch as reference frames, coefficients $I^{12}_{pred}$ of the secondary S-frame are constructed and added to the received quantised prediction error coefficients $I^{12}_{err}$ as described above, i.e., $I^{12}_{rec} = I^{12}_{err} + I^{12}_{pred} = I^2_{rec} - I^{12}_{pred} + I^{12}_{pred} = I^2_{rec}$. It can be noted from this equation that $I^{12}_{rec}$ and $I^2_{rec}$ are identical. Therefore, although the secondary S-frame $S_{12}$ and the S-frame of the second bit stream $S_2$ have different reference frames, when $S_{12}$ is decoded it produces an image with reconstructed pixel values identical to those that would result from decoding S-frame $S_2$.

From the foregoing description of the encoding and decoding of S-frames according to the invention, it will be appreciated that a significant difference exists compared with encoding and decoding of P-frames and I-frames according to prior art, specifically, it should be appreciated that when encoding or decoding an image block in SP or SI-format, the prediction P(x,y) for the block in question is transformed into the transform coefficient domain by applying a transformation such as a Discrete Cosine Transform. The transform coefficients thus produced are subsequently quantised and a prediction error is determined in the quantised coefficient domain. This contrasts with predictive coding according to prior art in which a prediction error is determined in the spatial (pixel value) domain.

In the following, operation of the decoder 1200 during switching between bit-streams 510 and 520 is described in detail. At the position in the video sequence where switching from the first bit-stream to the second bit-stream 520 takes place, the decoder 1200 has already received and decoded the previous P-frames 511 and 512 of the first bit-stream 510. The decoded frames are stored in frame memory 1250 and are thus available for use as reference frames. When switching from the first bit-stream 510 to the second bit-stream 520 takes place, encoder 1100 (FIG. 11) constructs and encodes secondary S-frame $S_{12}$ (550) and transmits the encoded video information representing $S_{12}$ to decoder 1200.

As previously explained, encoding is performed on a block-by-block basis. Specifically, secondary S frame $S_{12}$ is encoded as an assembly of image blocks and generally each image block is encoded as either an SP-coded block or an SI-coded block or an intra-block. For the SP-coded blocks of the secondary S-frame $S_{12}$, the compressed video information transmitted from encoder to decoder takes the form of quantised prediction error transform coefficients $I^{12}_{err}$ and motion vector information. For the SI-coded blocks of the secondary S-frame $S_{12}$ the compressed video information comprises quantised prediction error transform coefficients $I^{12}_{err}$ and information relating to the intra prediction mode used in forming the prediction for the SI-coded block in the encoder. As previously explained, the compressed video information is subjected to appropriate variable length coding (VLC) prior to transmission from the encoder in order to further reduce the number of bits required for its representation.

The compressed video information for a given image block is received at decoder 1200 and is first subjected to appropriate variable length decoding (VLD) and is separated into its constituent parts by demultiplexer 1210. The quantised prediction error coefficients $I^{12}_{err}$ extracted from the received bit-stream are applied to the first input of summer 1220 and a block of predicted pixel values P(x,y) is formed for each image block according to its coding mode (SP or SI). In the case of an SP-coded block, the block of predicted pixel values P(x,y) is formed in motion compensated prediction block 1260 using a reference frame from the first bit-stream (e.g. P-frame 511 or 512) available in frame memory 1250 and the motion vector information extracted from the encoded video information of secondary S-frame $S_{12}$ by demultiplexer 1210. In the case of an SI-coded block, a block of predicted pixel values P(x,y) is formed in intra prediction block 1270 using previously decoded pixels of the secondary S-frame $S_{12}$ also stored in frame memory 1250. Intra prediction is performed according to the intra prediction mode information extracted from the received video information for secondary S-frame $S_{12}$ by demultiplexer 1210.

Once a prediction for the current block of the secondary S-frame has been formed the predicted pixel values P(x,y) are passed to transform block 1290. Here a forward transform (e.g. a Discrete Cosine Transform (DCT)) is applied the predicted pixel values P(x,y) to form a set of transform coefficients $c_{pred}$. These transform coefficients are then passed to quantisation block 1295 where they are quantised to form quantised transform coefficients $I^{12}_{pred}$. The quantised transform coefficients $I^{12}_{pred}$ are, in turn, applied to the second input of summer 1220. Summer 1220 combines the quantised transform coefficients $I^{12}_{pred}$ with quantised prediction error transform coefficients $I^{12}_{err}$ to form reconstructed quantised transform coefficients $I^{12}_{rec}$ according to the relationship:

$$I^{12}_{rec} = I^{12}_{pred} + I^{12}_{err}.$$

The reconstructed quantised transform coefficients $I^{12}_{rec}$ are then supplied to inverse quantisation block 1230 where they are inverse quantised to form inverse quantised reconstructed transform coefficients $d^{12}_{rec}$. The inverse quantised reconstructed transform coefficients $d^{12}_{rec}$ are then passed to inverse transform block 1240 where they are subjected to an inverse transform operation (e.g. an Inverse Discrete Cosine Transform (IDCT)). As a result, a block of reconstructed pixel values is formed for the current block of the secondary S-frame $S_{12}$. The reconstructed pixel values $I_c(x,y)$ are supplied to the video output and to frame memory 1250. As subsequent blocks of the secondary S-frame $S_{12}$ are encoded, transmitted from encoder 1100 to decoder 1200 and subsequently decoded, a decoded version of the secondary S-frame is progressively built up in frame memory 1250. From there, the already decoded blocks of the secondary S-frame can be retrieved and used by intra prediction block 1270 to form predicted pixel values P(x,y) for subsequent blocks of the secondary S-frame $S_{12}$. Here it should be remembered that the quantised prediction error transform coefficients for each image block of the secondary S-frame $S_{12}$ are generated in encoder 1100 according to the relationship:

$$I^{12}_{err} = I^{2}_{rec} - I^{12}_{pred}$$

where $I^{2}_{rec}$ are quantised reconstructed transform coefficient values produced by encoding and subsequently decoding S-frame $S_2$ in the second bit-stream. This means that the reconstructed transform coefficients $I^{12}_{rec}$ produced by decoding the compressed video information for secondary S-frame $S_{12}$ are identical to those which would have been produced if S-frame $S_2$ from the second bit-stream had been transmitted and decoded. As previously explained, this follows since:

$$I^{12}_{rec} = I^{12}_{pred} + I^{12}_{err}$$

$$= I^{12}_{pred} + I^{2}_{rec} - I^{12}_{pred} = I^{2}_{rec}$$

Thus, $I^{12}_{rec} = I^{2}_{rec}$.

Therefore it can be seen that by constructing a secondary S-frame $S_{12}$ according to the method of the invention, transmitting it from encoder to decoder and subsequently decoding it, mis-match-free switching between a first and a second bit-stream can be achieved.

Consider the case that the secondary S-frame is an SI-frame while the S-frame within the bit stream is an SP-frame. In this case, a frame which uses motion-compensated prediction is represented by a frame which uses only spatial prediction. This special case has implications in random access and error resiliency which will described later.

It should be noted that in encoder 1100 and decoder 1200 according to the first embodiment of the invention, described above, the quantisation applied to the transform coefficients $c_{pred}$ produced in transform blocks 1160 (encoder) and 1290 (decoder) to yield quantised transform coefficients $I_{pred}$ is the same as that used to generate the quantised prediction error transform coefficients $I_{err}$. More specifically, in the first embodiment of the invention, when a block of predicted pixel values P(x,y) is produced for an image block of an S-frame which is being encoded/decoded, the quantisation parameter QP used to quantise the transform coefficients $c_{pred}$ corresponding to the predicted block of pixel values P(x,y) should be the same as the quantisation parameters used in generating the quantised prediction error transform coefficients $I_{err}$. This is advantageous since the summation performed in order to produce reconstructed transform coefficients $I_{rec}$ is performed in the quantised transform coefficient domain, i.e. since $$I_{rec} = I_{pred} + I_{err},$$

failure to use identical quantisation parameters in the construction of $I_{pred}$ and $I_{err}$ will lead to errors in the reconstructed quantised transform coefficients $I_{rec}$.

Figure 15:
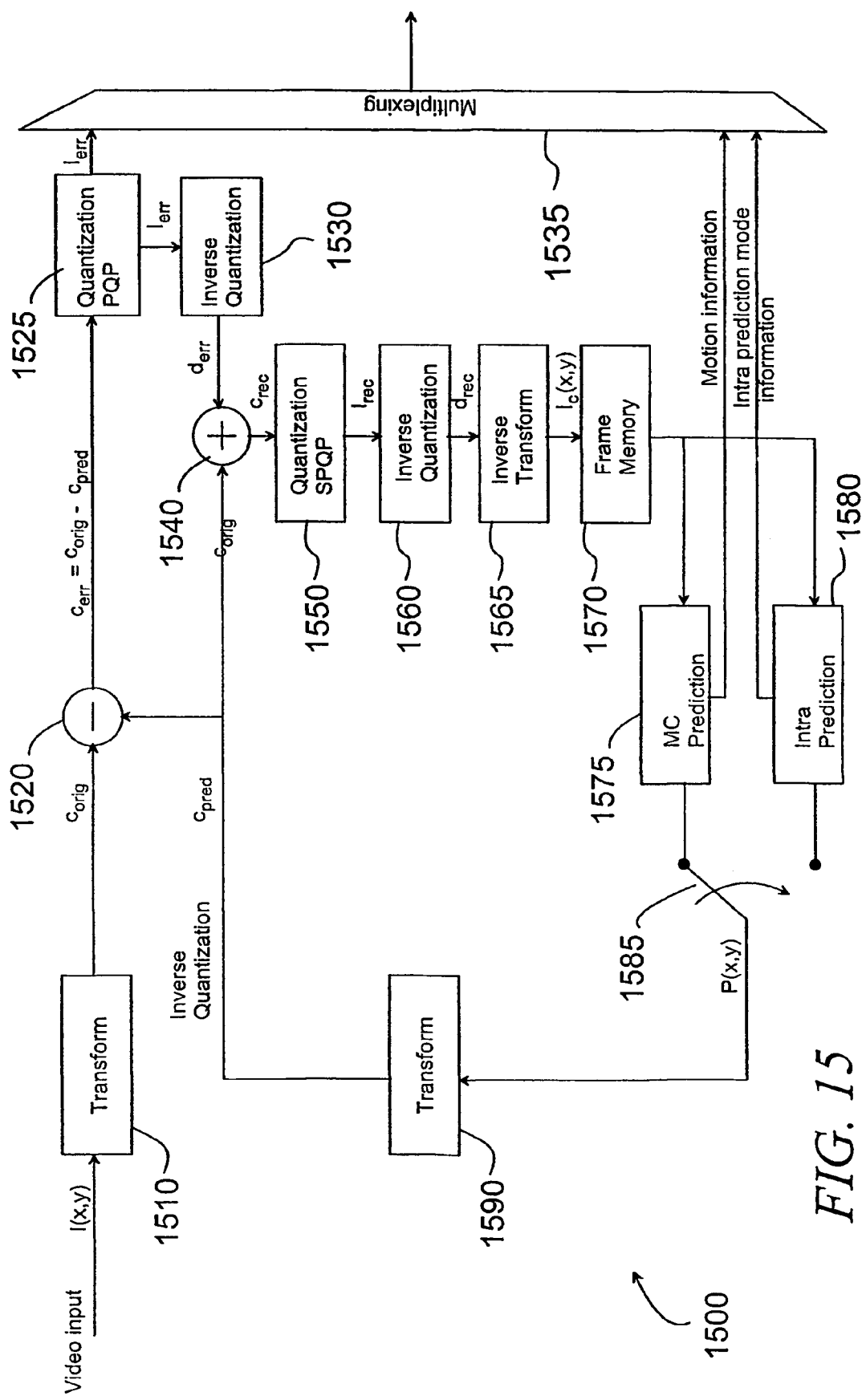
FIG. 15 is a block diagram of an encoder in accordance with the third advantageous embodiment of the invention.

FIG. 15 shows a block diagram of an S-frame encoder 1500 according to a second embodiment of the invention which provides greater flexibility in the choice of quantisation parameters to generate the quantised transform coefficients $I_{pred}$ and $I_{err}$. As can be seen by comparing FIG. 15 with FIG. 11, the principal difference between the S-frame encoder 1500 according to a second embodiment of the invention and S-frame encoder 1100 according to a first embodiment of the invention concerns the location of quantisation blocks 1525 and 1550. The operation of the S-frame encoder 1500 according to the second embodiment of the invention will now be described in detail with reference to FIG. 15.

According to the second embodiment of the invention a video frame to be encoded in S-frame format is first partitioned into blocks and each block is then encoded as either on SP-block or on SI-block. Switch 1585 is operated as appropriate to switch between the SP and SI coding modes. In SP coding mode switch 1585 is operated to obtain a motion compensated prediction for the current block of the frame being encoded from motion compensated prediction block 1575. Motion compensated prediction block 1575 forms a block of predicted pixel values P(x,y) for the current block of the frame being encoded by determining a motion vector describing the relationship between the pixels of the current block and pixel values of a reconstructed reference frame held in frame memory 1570.

In SI-coding, mode switch 1585 is operated to obtain a prediction for the current block of the frame being encoded from intra prediction block 1580. Intra prediction block 1580 operates in a manner analogous to that described in connection with the first embodiment of the invention to form a block of predicted pixel values P(x,y) for the current block of the frame being encoded using spatial prediction from already encoded neighbouring pixels within the frame being encoded.

In both SP- and SI-coding modes a forward transform, for example a Discrete Cosine Transform (DCT), is applied to the predicted block of pixel values P(x,y) in transform block 1590. The resulting transform coefficients $c_{pred}$ are supplied to summers 1520 and 1540. The original image data, comprising the actual pixel values of the image block currently being encoded, are passed to transform block 1510 where they too are subjected to a forward transform (e.g. DCT). The resulting transform coefficients $c_{orig}$ are then passed to summer 1520 which forms a difference between $c_{orig}$ and $c_{pred}$ to generate prediction error transform coefficients $c_{err}$ according to the relationship:

$$c_{err} = c_{orig} - c_{pred}.$$

The prediction error transform coefficients are supplied to quantisation block 1525 where they are quantised using quantisation parameter PQP to form quantised prediction error transform coefficients $I_{err}$ which are, in turn passed to multiplexer 1535.

If the current block is being encoded in SP-format, multiplexer 1540 also receives information relating to the motion vectors used in formation of the motion compensated prediction P(x,y) for the SP-coded block. If the current block is being encoded in SI-format information concerning the intra prediction mode used to form the prediction P(x,y) for the SI-coded block is also passed to the multiplexer. Advantageously, multiplexer 1540 applies appropriate variable length coding (VLC) to the quantised prediction error transform coefficients $I_{err}$ and to the motion vector or intra prediction mode information and forms a bit-stream for transmission to a corresponding decoder by multiplexing together the various forms of information.

The quantised prediction error transform coefficients $I_{err}$ are passed from quantisation block 1525 to inverse quantisation block 1530 where they are inverse quantised using quantisation parameter POP to form inverse quantised prediction error transform coefficients $d_{err}$. The inverse quantised prediction error transform coefficients $d_{err}$ are next passed to summer 1540 where they are combined with the transform coefficients $c_{pred}$ produced from the predicted pixel values P(x,y) for the current block. More specifically, summer 1540 adds transform coefficients $c_{pred}$ and inverse quantised prediction error transform coefficients $d_{err}$ to form reconstructed transform coefficients $c_{rec}$ according to the relationship:

$$c_{rec}=c_{pred}+d_{err}$$

The reconstructed transform coefficients $c_{rec}$ are then passed to quantisation block 1550 where they are quantised using quantisation parameter SPQP to produce quantised reconstructed transform coefficients $I_{rec}$. It should be noted that quantisation parameter SPQP used to quantise the reconstructed transform coefficients is not necessarily the same as the quantisation parameter PQP used to quantise the prediction error transform coefficients $c_{err}$ in quantisation block 1525. In particular, a finer quantisation can be applied to reconstructed transform coefficients $c_{rec}$ and a courser quantisation can be applied to prediction error coefficients $c_{err}$. This ultimately results in a smaller reconstruction error (distortion) when a decoded image is formed in the decoder.

Quantised reconstructed transform coefficients $I_{rec}$ are next supplied to inverse quantisation block 1560 where they are inverse quantised using quantisation parameter SPQP to form inverse quantised reconstructed transform coefficients $d_{rec}$. The inverse quantised reconstructed transform coefficients $d_{rec}$ are then passed to inverse transform block 1565 where they are subjected to an inverse transform operation e.g. an Inverse Discrete Cosine Transform (IDCT). As a result of this operation, a block of reconstructed pixel values $I_c(x,y)$ is formed for the image block in question. The block of reconstructed pixel values $I_c(x,y)$ is subsequently stored in frame memory 1570. As subsequent blocks of the frame being encoded in S-frame format undergo the previously described encoding and local decoding operations, a decoded version of the current frame is progressively assembled in frame memory 1570 from where it can be accessed and used in intra prediction of subsequent blocks of the same frame or in inter (motion compensated) prediction of subsequent frames in the video sequence.

Figure 13:
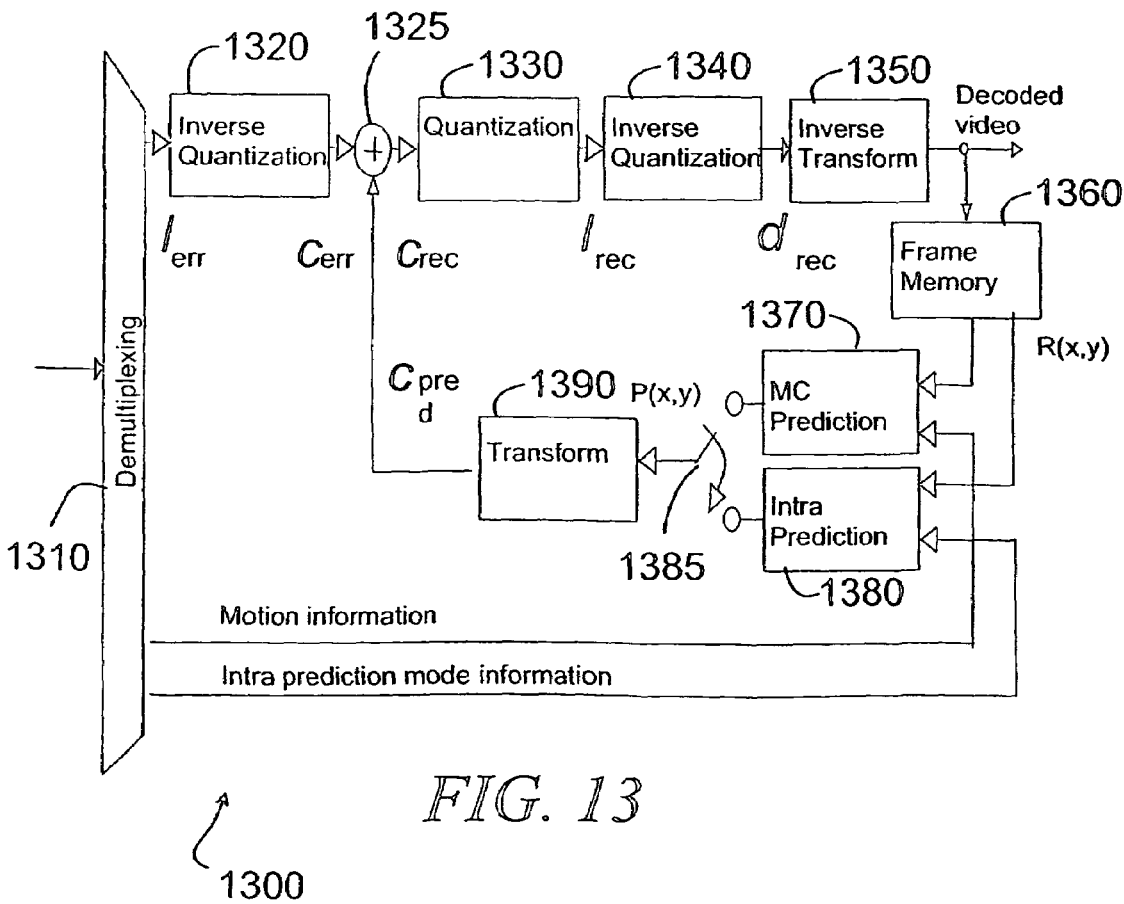
FIG. 13 is a block diagram of an encoder according to a second embodiment of the invention.

Operation of an S-frame decoder 1300 according to the second embodiment of the invention will now be described with reference to FIG. 13. The bit-stream generated by the S-frame encoder 1500 according to the second embodiment of the invention and described above in connection with FIG. 15 is received by decoder 1300 and is demultiplexed into its constituent parts. The decoder reconstructs a decoded version of the S-frame on a block-by-block basis. As previously described, an S-frame generally comprises both SP-coded and SI-coded image blocks. For SP-coded image blocks, the information in the received bit-stream comprises VLC encoded motion vector information and VLC encoded quantised prediction error transform coefficients $I_{err}$. For image blocks encoded in SI-format, the information in the received bit-stream comprises VLC encoded information relating to the intra prediction mode used to form the intra prediction for the SI-coded block, as well as VLC encoded quantised prediction error transform coefficients $I_{err}$.

When decoding an SP-coded image block, demultiplexer 1310 first applies appropriate variable length decoding (VLD) to the received bit-stream to recover the motion vector information and quantised prediction error coefficients $I_{err}$. It then separates the motion vector information from the quantised prediction error coefficients $I_{err}$. The motion vector information is supplied to motion compensated prediction block 1370 and the quantised prediction error coefficients $I_{err}$ recovered from the received bit-stream are applied to inverse quantisation block 1320. The motion vector information recovered from the received bit-stream is used in motion compensated prediction block 1370 together with pixel values of a previously reconstructed frame held in frame memory 1360 to form a prediction. P(x,y) for the current block being decoded, in a manner analogous to that employed in encoder 1500.

When decoding an SI-coded image block, demultiplexer 1310 applies appropriate variable length decoding to the received intra prediction mode information and the quantised prediction error transform coefficients $I_{err}$. The intra prediction mode information is then separated from the quantised prediction error transform coefficients $I_{err}$ and is supplied to intra prediction block 1380. The quantised prediction error transform coefficients $I_{err}$ are supplied to inverse quantisation block 1320. The intra prediction mode information recovered from the received bit-stream is used in intra prediction block 1380 in conjunction with previously decoded pixel values of the current frame held in frame memory 1360 to form a prediction P(x,y) for the current block being decoded. Again, the intra prediction process performed in decoder 1200 is analogous to that performed in the corresponding encoder 1500 previously described.

For both SP- and SI-coded image blocks the quantised prediction error transform coefficients $I_{err}$ recovered from the received bit-stream are inverse quantised in inverse quantisation block 1320 using quantisation parameter PQP to form inverse quantised prediction error transform coefficients $d_{err}$. The inverse quantised prediction error transform coefficients $d_{err}$ are applied to one input of summer 1325.

Once a prediction P(x,y) for the current block of the frame being decoded has been formed, either by motion compensated prediction in motion compensated prediction block 1370 or by intra prediction in intra prediction block 1380, switch 1385 is operated as appropriate to supply the predicted pixel values P(x,y) to transform block 1390. Here a forward transform, for example a Discrete Cosine Transform (DCT) is applied to the predicted block of pixel values P(x,y) to form transform coefficients $c_{pred}$. Transform coefficients $c_{pred}$ are then supplied to the second input of summer 1325 where they are combined with the inverse quantised prediction error transform coefficients received from inverse quantisation block 1320, to form reconstructed transform coefficients $c_{rec}$. More specifically, the reconstructed transform coefficients are determined by adding together transform coefficients $c_{pred}$ and inverse quantised prediction error transform coefficients $d_{err}$ according to the relationship:

$$c_{rec}=c_{pred}+d_{err}$$

The reconstructed transform coefficients $c_{rec}$ are then passed to quantisation block 1330 where they are quantised to produce quantised reconstructed transform coefficients $I_{rec}$ using quantisation parameter SPQP. The quantised reconstructed transform coefficients $I_{rec}$ are, in turn, supplied to inverse quantisation block 1340 where they are inverse quantised using quantisation parameter SPQP to form inverse quantised reconstructed transform coefficients $d_{rec}$. The inverse quantised reconstructed transform coefficients $d_{rec}$ are then passed to inverse transform block 1350 where they are subjected to an inverse transform operation, for example an Inverse Discrete Cosine Transform (IDCT). As a result of the inverse transformation applied in inverse transform block 1350, a block of reconstructed image pixels $I_c(x,y)$ is formed for the image block in question. The block of reconstructed pixels $I_c(x,y)$ is supplied to the video output of the decoder and to frame memory 1360, where the pixels are stored. As subsequent blocks of the S-frame undergo the decoding operations described above, a decoded version of the current frame is progressively assembled in frame memory 1360. From there in can be accessed and used in the intra prediction of subsequent blocks of the same frame or in inter (motion compensated) prediction of subsequent frames in the video sequence.

Figure 16:
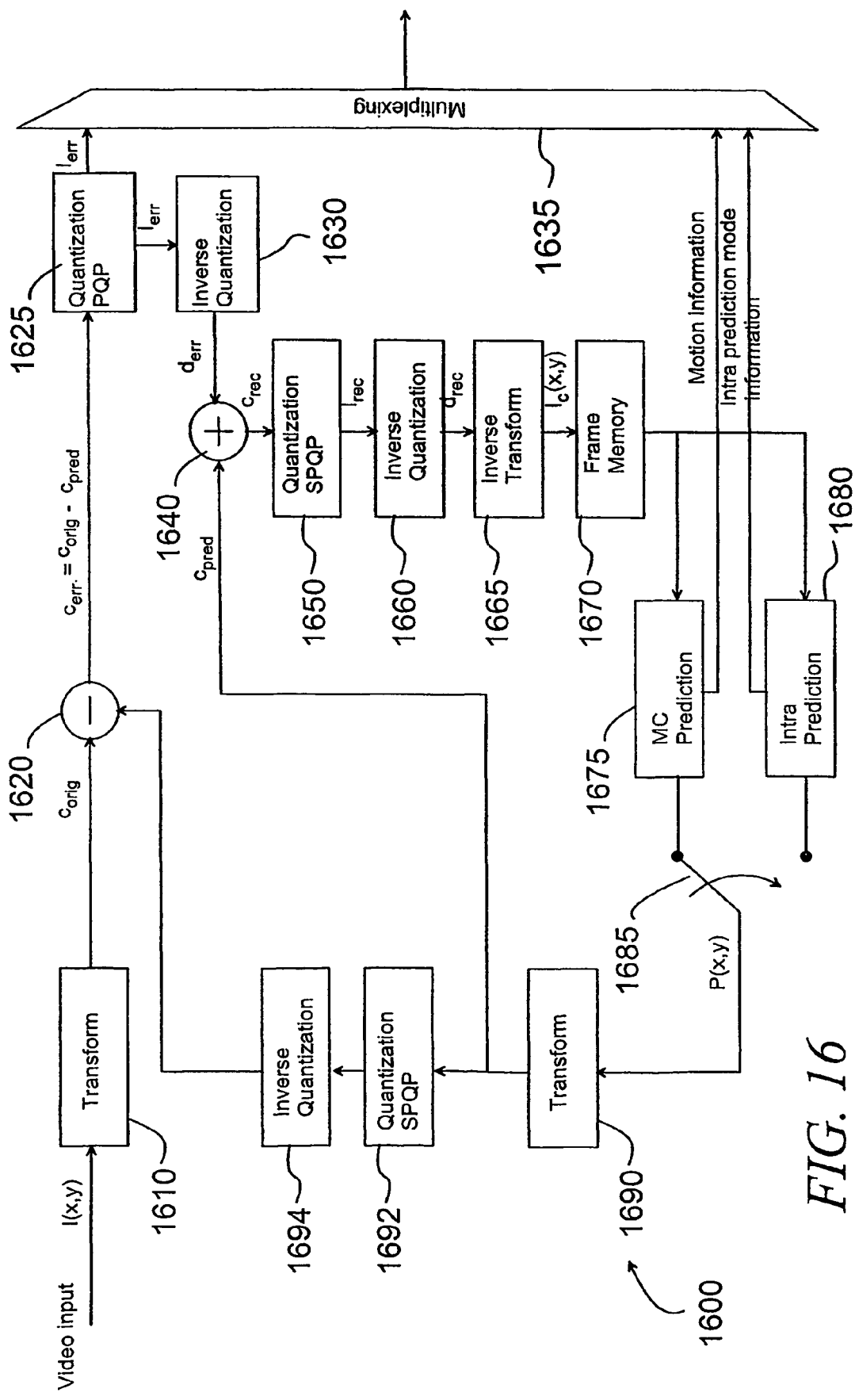
FIG. 16 is a block diagram of an encoder in accordance with yet another advantageous embodiment of the invention.

In FIG. 16, an encoder according to a third embodiment of the invention is shown. In this embodiment, the transform coefficients $c_{pred}$ undergo quantisation and inverse quantisation using the same quantisation parameter SPQP both in the encoder section (blocks 1625 and 1630) and in the decoder section (blocks 1692 and 1694). Therefore, the encoder does not introduce any additional quantisation error to the prediction loop, and error build-up in the prediction loop is thus effectively prevented. The blocks 1610, 1620, 1625, 1630, 1635, 1640, 1650, 1660, 1665, 1670, 1675, 1680, 1685, 1690 have similar functionality to the blocks 1510, 1520, 1525, 1530, 1535, 1540, 1550, 1560, 1565, 1570, 1575, 1580, 1585, 1590 presented in FIG. 15, respectively.

Figure 6:
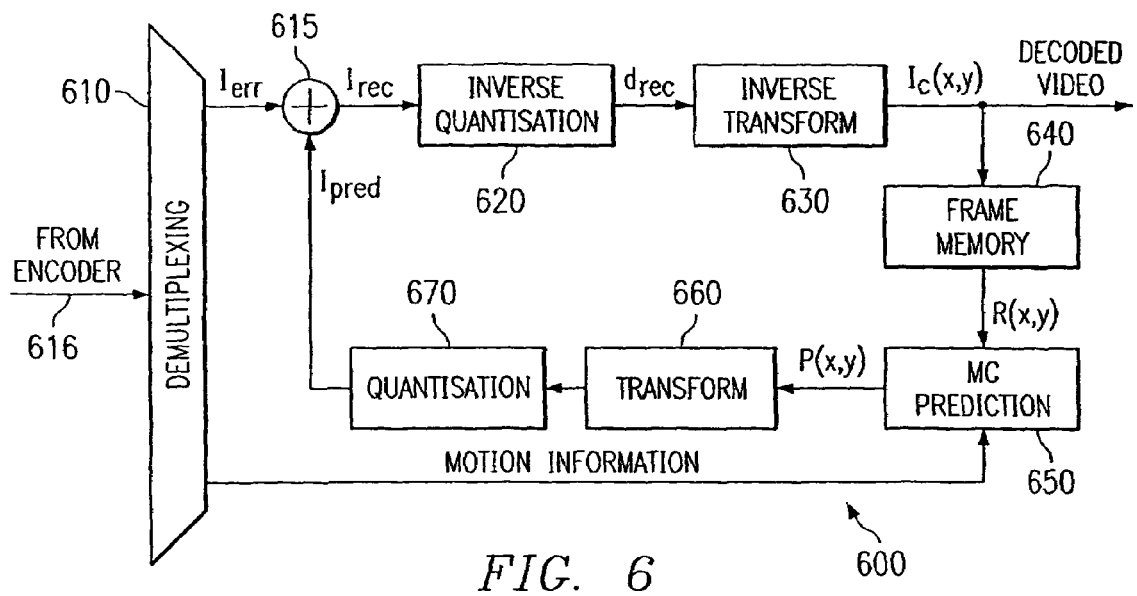
FIG. 6 is a block diagram of a decoder in accordance with an advantageous embodiment of the invention.

In FIG. 6, a decoder 600 according to an advantageous embodiment of the invention is described. Most of the elements of the decoder 600 are the same than of the decoder 1200 presented in FIG. 12. The operational blocks of the decoder 600 are arranged to decode the prediction blocks of the frames, wherein no switching means are not shown in FIG. 6. Other blocks 610, 615, 620, 630, 640, 650, 660 and 670 have similar functionality to the blocks 1210, 1220, 1230, 1240, 1250, 1260, 1290 and 1295 presented in FIG. 12, respectively.

Figure 9:
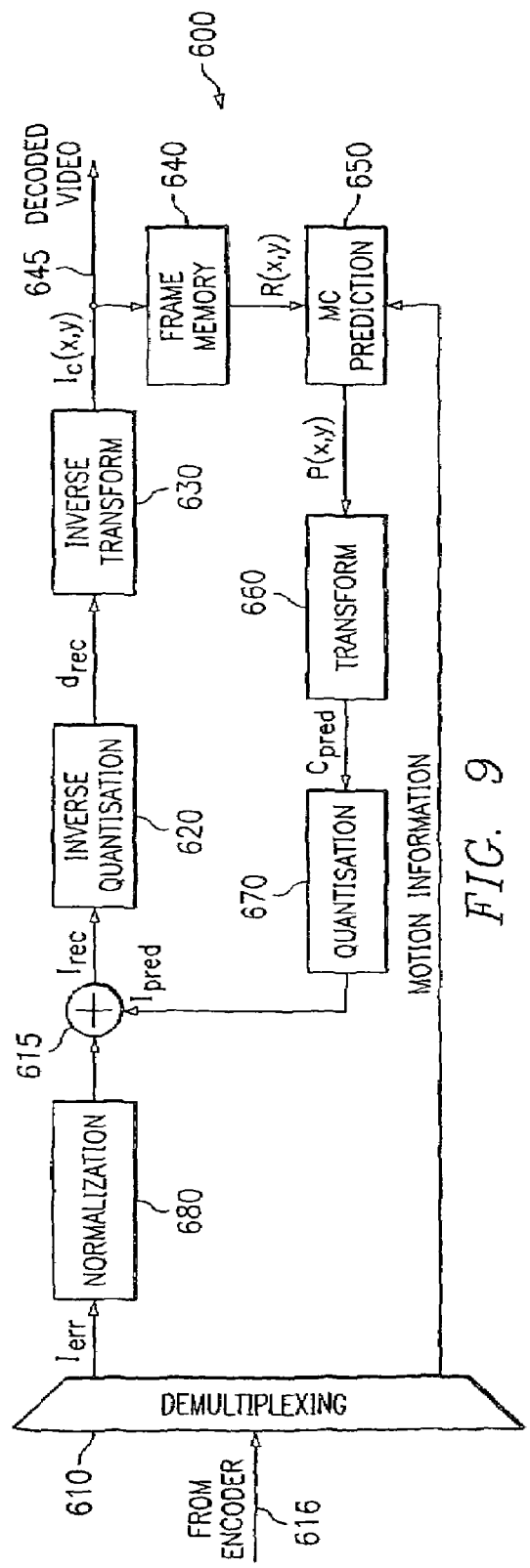
FIG. 9 is a block diagram of a decoder in accordance with another advantageous embodiment of the invention.
Figure 12:
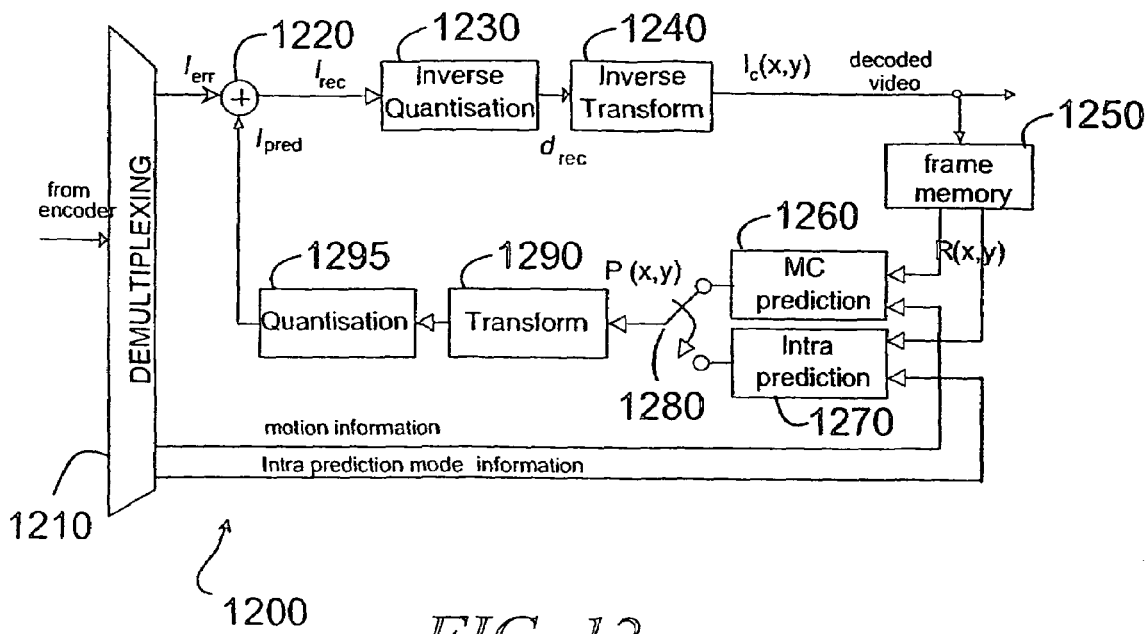
FIG. 12 is a block diagram of a decoder in accordance with another advantageous embodiment of the invention.

In FIG. 9, a decoder 600 according to another advantageous embodiment of the invention is described. The decoder 600 presented in FIG. 9 is a modification from the decoder 600 shown in FIG. 6. The difference between the decoder presented in FIG. 9 and the decoder presented in FIG. 12 is that a normalisation block 680 is inserted between the demultiplexer 610 and one input of summing element 615. Other blocks 610, 615, 620, 630, 640, 650, 660 and 670 have similar functionality to the blocks 1210, 1220, 1230, 1240, 1250, 1260, 1290 and 1295 presented in FIG. 12, respectively.

Figure 10:
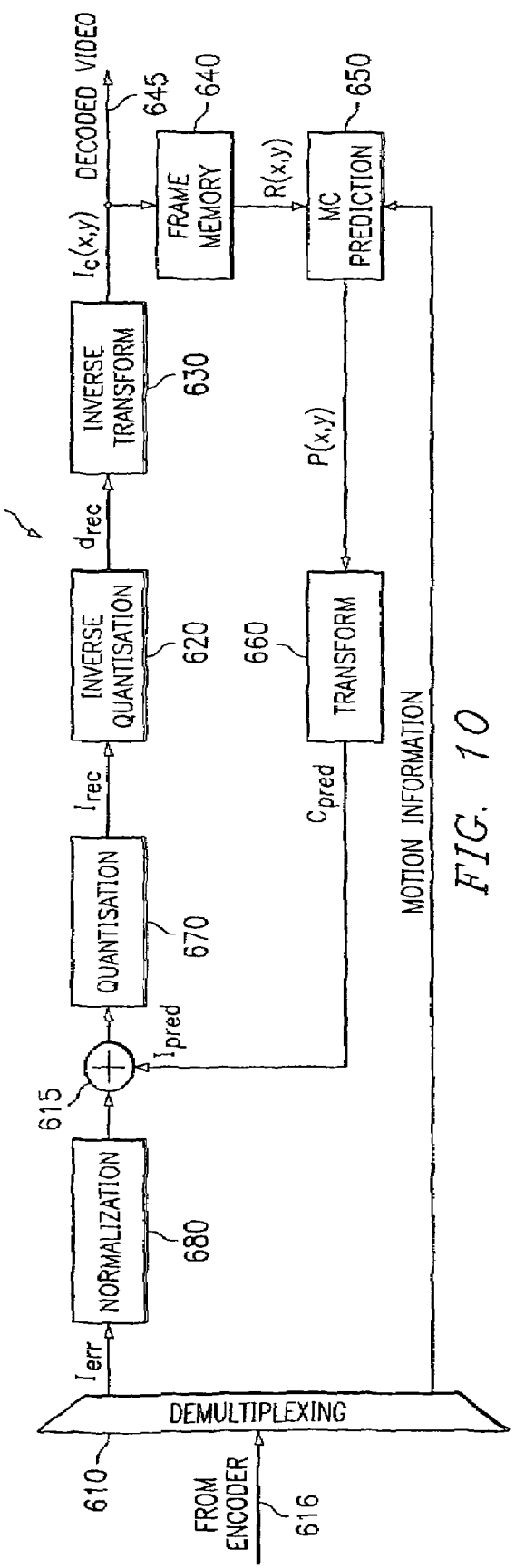
FIG. 10 is a block diagram of an decoder in accordance with yet another advantageous embodiment of the invention.

In FIG. 10, a decoder 600 according to yet another advantageous embodiment of the invention is described. Most of the elements of the decoder 600 are the same than of the decoder 1300 presented in FIG. 13. The operational blocks of the decoder 600 are arranged to decode the prediction blocks of the frames, wherein no switching means are not shown in FIG. 10. The other difference between the decoder presented in FIG. 13 and the decoder presented in FIG. 10 is that a normalisation block 680 is used instead of inverse quantisation block 1230. Other blocks 610, 615, 620, 630, 640, 650, 660 and 670 have similar functionality to the blocks 1310, 1325, 1330, 1340, 1350, 1360, 1370 and 1390 presented in FIG. 13, respectively.

The encoding of a video frame can be performed block-by-block basis such that in the same encoded video frame there can exist differently encoded areas. For example, some parts of the frame can be inter coded and some other parts of the frame can be intra coded. The above procedures are applied to each part of the frame appropriately, according to the encoding procedure of the part in question.

In addition to the transmission network, the request for the change of the bit stream transmission properties may also be originated by other parts of the transmission system. For example, the receiver may request the transmitting server to change the parameters for some reason. This request is delivered to the transmitting server e.g. via the transmission network.

Although H.26L is used as an example of a standard, embodiments of the present invention and any variations and modifications are deemed to be within the scope of the present invention.

Figure 8:
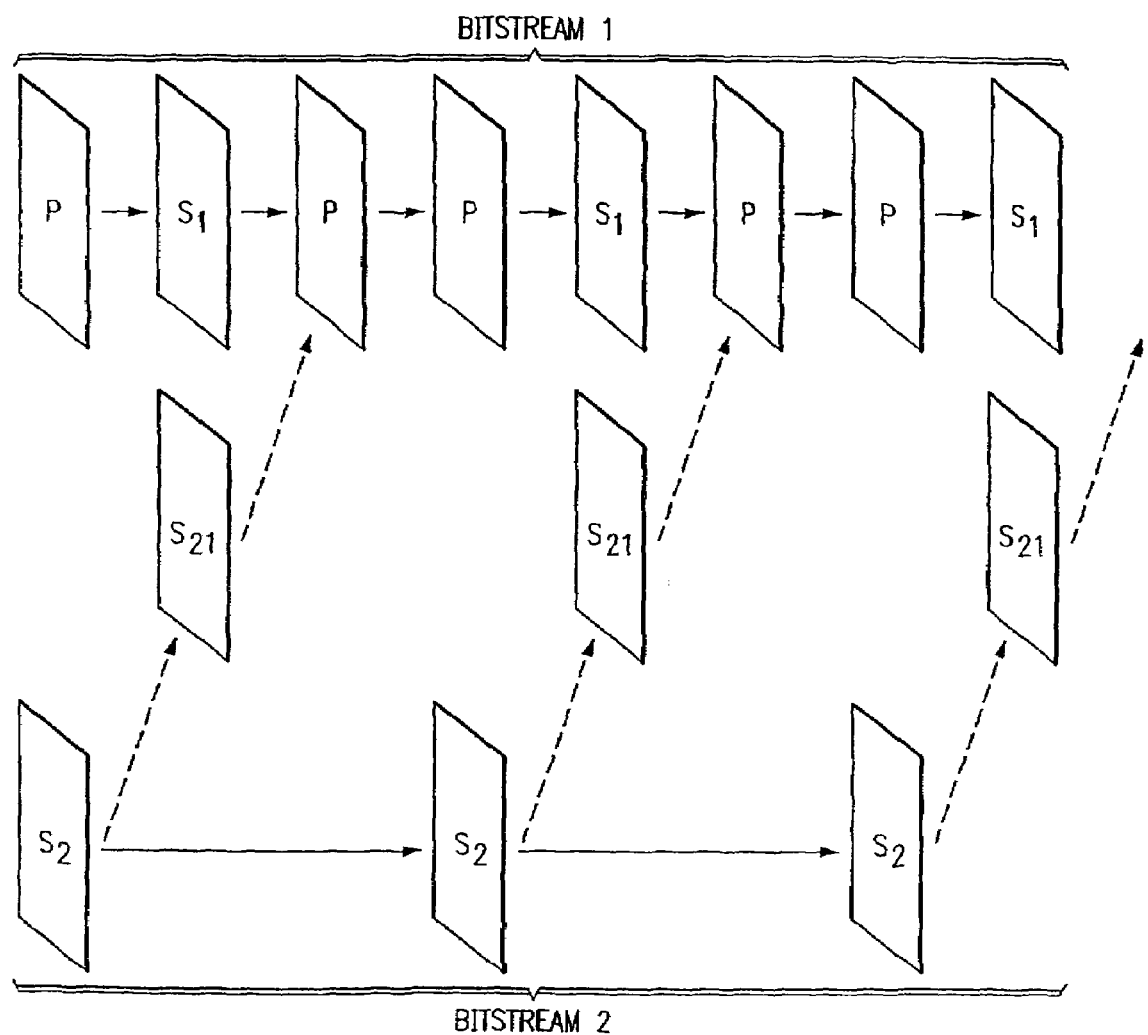
FIG. 8 is an illustration of a fast-forward process using S-frames.

Bit stream switching is not the only application in which the present invention can be applied. If one of the bit streams has a lower temporal resolution, e.g. 1 frame/sec, this bit stream can be used to provide fast-forward functionality. Specifically, decoding from the bit stream with a lower temporal resolution and then switching to the bit stream with a normal frame rate would provide such functionality. FIG. 8 depicts two bit streams the second of which comprises only S-frames predicted from each other at intervals greater than the frame repetition interval of the first bit-stream. Furthermore, "Fast Forward" can start and stop at any location in the bit-stream. In the following, some other applications of the present invention are described.

Splicing and Random Access

The bit stream-switching example discussed earlier considered bit streams belonging to the same sequence of images. However, this is not necessarily the case in all situations where bit stream switching is needed. Examples include: switching between bit streams arriving from different cameras capturing the same event but from different perspectives, or cameras placed around a building for surveillance; switching to local/national programming or insertion of commercials in a television broadcast, video bridging, etc. The general term for the process of concatenating encoded bit streams is splicing.

Figure 7:
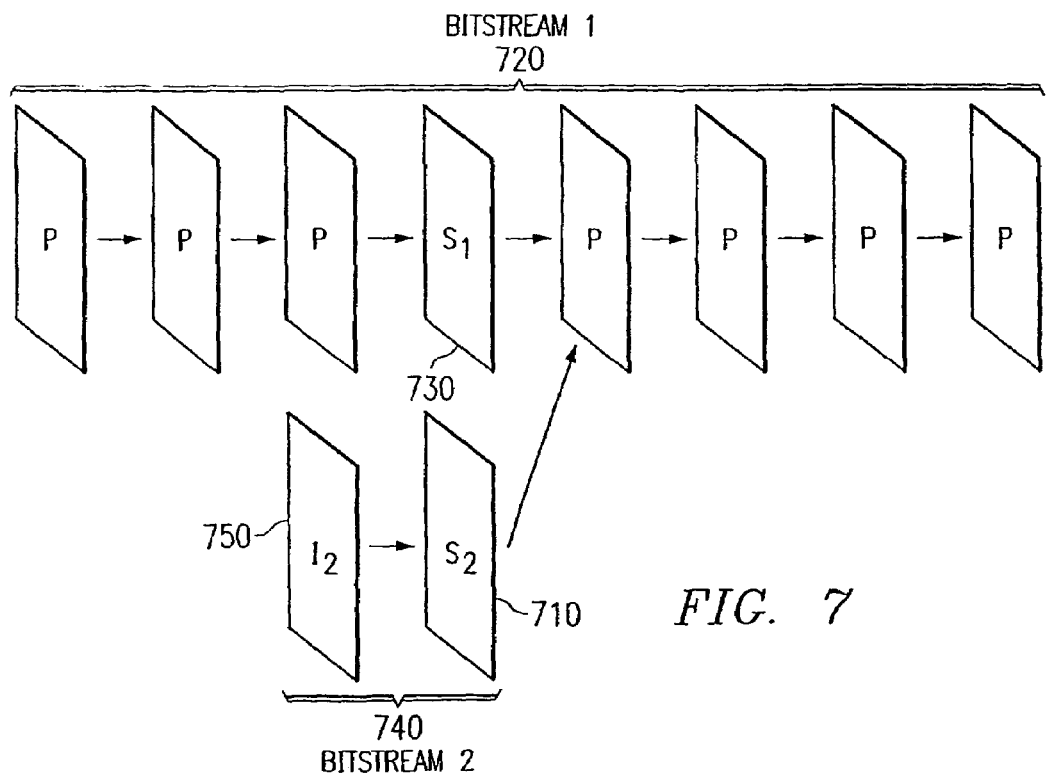
FIG. 7 is an illustration of random access using S-frames.

When switching occurs between bit streams that belong to different sequence of images, this only affects the encoding of the S-frames used to switch between bit streams, i.e., the secondary S-frame $S_{12}$ in FIG. 5. Specifically, the use of motion-compensated prediction of frames in one sequence of images using reference frames from a different sequence of images is not as efficient as when both bit streams belong to the same sequence of images. In this case, it is most likely that spatial prediction of the secondary S-frames frames would be more efficient. This is illustrated in FIG. 7 where the switching frame is an SI-frame using only spatial prediction, which identically reconstructs the corresponding SP-frame $S_2$. This method can be used as a random access mechanism into a bit stream and has further implications in error recovery and resilience as described in the following.

Error Recovery

Figure 14:
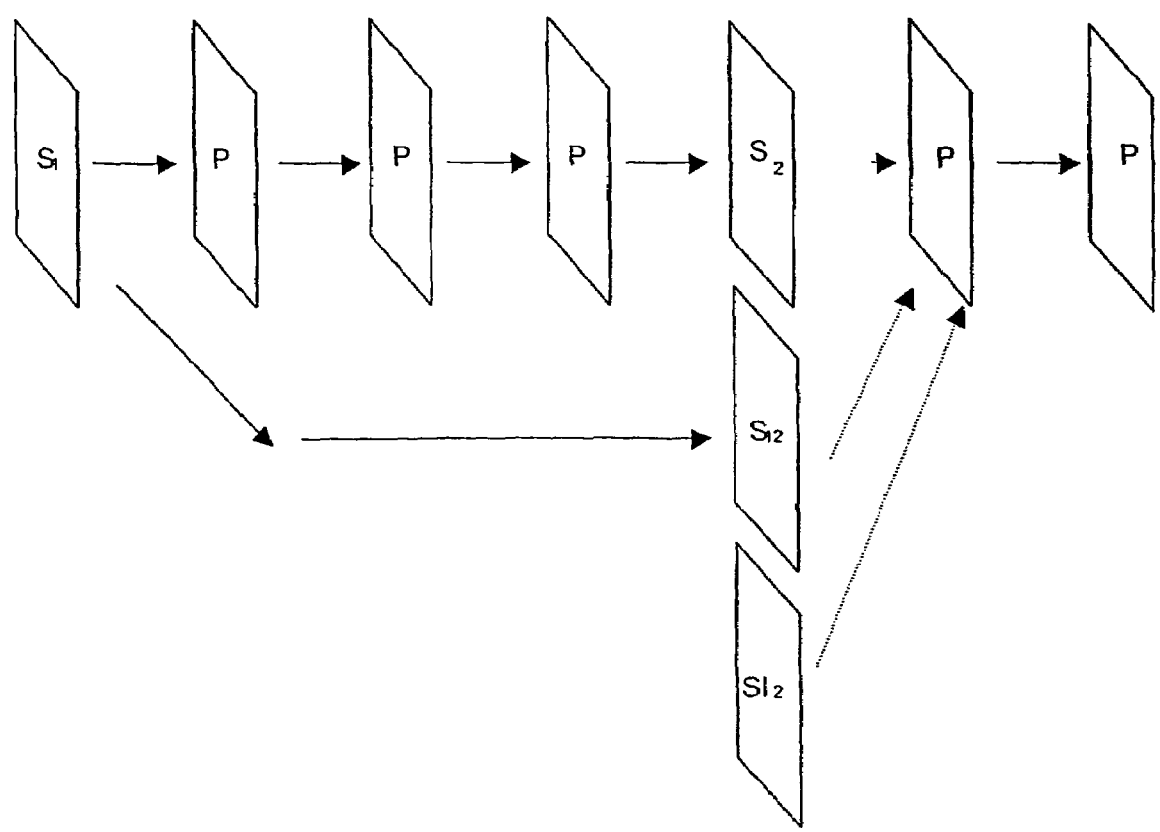
FIG. 14 is an illustration of a error resiliency/recovery process using SP-frames.

Multiple representations of a single frame in the form of S-frames predicted from different reference frames, e.g., predicted from the immediately preceding reconstructed frame and a reconstructed frame further back in time can be used to increase error resilience of an encoded video sequence and/or to improve recovery from errors in the bit-stream. This is illustrated in FIG. 14. In a situation where a packet loss occurs during streaming of a pre-encoded bit stream and a frame or slice is lost, the receiver informs the transmitter of the lost frame/slice and the transmitter responds by sending one of the alternative representations of the next S-frame. The alternative representation, e.g. frame $S_{12}$ in FIG. 14, uses reference frames that have already been correctly received by the receiver. For slice based packetization and delivery, the sender could further estimate the slices that would be affected by such a slice/frame loss and update only those slices in the next S-frame with their alternative representations.

Similarly, and as mentioned earlier in the discussion of splicing, the secondary representation of the S-frame can be generated without using any reference frames, i.e., an $SI_2$-frame such as that shown in FIG. 14. In this case, the sender would send the secondary SI-frame, i.e., $SI_2$ instead of $S_2$ to stop error propagation. This approach could also be extended in a straight forward manner to slice-based encoding/packetization. More specifically, the server sends the slices in the next S-frame, which would be affected by the packet loss, from SI-frame.

Error Resilience

The encoding of a video frame can be performed block-by-block basis such that in the same encoded video frame there can exist differently encoded areas. For example, some parts of the frame can be inter coded and some other parts of the frame can be intra coded. And as already discussed, the intra-block coding, since it doesn't employ any temporal correlation, stops any error propagation which might be started due to transport impairments.

In lossy transport networks, an intra macroblock refresh strategy can provide significant error resiliency/recovery performance. In an interactive client/server scenario, the encoder on the server side decides to encode the frames/macroblocks either based on specific feedback received from the client, e.g., the exact location of the lost/corrupted frame/slice/macro block, or based on the expected network conditions calculated through negotiation or the measured network conditions. This kind of intra-macroblock update strategy improves the quality of the received video by providing error resiliency and error recovery. The optimal intra-macroblock update refresh rate, i.e., the frequency at which macroblocks are intra-coded, depends on the transport channel conditions, e.g., packet loss and/or bit error rate. However, when already encoded bit streams are sent, which is the case in typical streaming applications, the above strategy cannot be applied directly. Either the sequence needs to be encoded with the worst-case expected network conditions or additional error resiliency/recovery mechanisms are required.

From the earlier discussion concerning the use of S-frames in error recovery and splicing applications, it can be noted that S-frames or slices within them can easily be represented as SI-frames/slices that do not use any reference frames while still leading to identical reconstruction of the S-frame. This feature can be exploited in the adaptive intra refresh mechanism discussed above. First, a sequence of images is encoded with some predefined ratio of S-macroblocks. Then during the transmission, some of the S-macroblocks are sent in their secondary representation that is as SI-macro blocks. The number of S-macroblocks to be sent in SI representation can be calculated in a manner similar to the method used in the real-time encoding/delivery approach previously described.

Video Redundancy Coding

S-frames have other uses in applications in which they do not act as replacements of I-frames. Video Redundancy Coding (VRC) can be given as an example. The principle of the VRC method is to divide a sequence of pictures into two or more threads in such a way that all pictures in the sequence are assigned to one of the threads in a round-robin fashion. Each thread is coded independently. At regular intervals, all threads converge into a so-called sync frame. From this sync frame, a new thread series is started. If one of the threads is damaged e.g. because of a packet loss, the remaining threads typically stay intact and can be used to predict the next sync frame. It is possible to continue the decoding of the damaged thread, which leads to slight degradation in picture quality, or to stop the decoding of the damaged thread, which leads to a drop in the frame rate. Sync frames are always predicted from one of the undamaged threads. This means that the number of transmitted I-frames can be kept small, because there is no need for complete re-synchronization. For the sync frame more than one representation (P-frame) is sent, each one using a reference frame from a different thread. Due to the use of P-frames these representations are not identical. Therefore mismatch is introduced when some of the representations cannot be decoded and their counterparts are used when decoding the following threads. The use of S-frames as sync frames eliminates this problem.

It is obvious that the present invention is not limited to the above described embodiments but it can be modified within the scope of the appended claims.

The invention claimed is:

1. A method for transmitting video information, in which at least a first bit-stream and a second bit-stream are formed from the video information, the first bit-stream comprises a first set of frames comprising at least one video frame, and the second bit-stream comprises a second set of frames comprising at least one predictive video frame, at least partly different encoding parameters are used with encoding of the frames of said first bit-stream and said second bit-stream, at least one frame of said first bit-stream is being transmitted, and the transmission is switched over from said first bit-stream to said second bit-stream, wherein in switching the transmission over from said first bit-stream to said second bit-stream, the second bit-stream comprises at least one primary switching frame, a secondary switching frame corresponding to the at least one primary switching frame is transmitted, the secondary switching frame having been encoded using encoding parameters of the corresponding at least one primary switching frame in the second bit-stream and at least one reference frame from the already transmitted at least one frame of said first bit-stream in such a way that when the secondary switching frame is decoded its reconstructed pixel values are identical to those otherwise resultant from transmission of the at least one primary switching frame in the second bit-stream, the transmission is continued to transmit at least one frame subsequent to the primary switching frame from said second bitstream and said secondary switching frame is used in place of the primary switching frame as a reference frame to be used in the reconstruction of said at least one predictive video frame of the second set of video frames.

2. The method according to claim 1, wherein the first bit-stream comprises at least one primary switching frame.

3. The method according to claim 1, wherein the first bit-stream comprises one intra frame and one secondary switching frame to perform a changeover from one location of the video information to another location of the video information.

4. The method according to claim 1, wherein the first bit-stream comprises only intra frames and primary switching frames to perform fast forward operation to the video information.

5. The method according to claim 1, wherein said primary switching frame or secondary switching frame is a predictive video frame, in which prediction information comprises only intra prediction information.

6. The method according to claim 2, wherein a block in the primary switching frame is predicted with respect to a reference block, and transform coefficients $c_{pred}$ of the prediction block of the block in the primary switching frame are calculated and quantized to form quantized values of the transform coefficients $I_{pred}$, that quantized coefficients $I_{err}$ for prediction error of the block in the primary switching frame are defined, wherein reconstructed quantized transform coefficients $i_{rec}$ are defined so that coefficients $c_{rec}$ for the block in the primary switching frame exist from which by quantization reconstructed quantized transform coefficients $I_{rec}$ can be obtained, and that reconstructed quantized transform image coefficients $I_{rec}$ fulfil one of the following conditions:

$$I_{rec} = I_{pred} + I_{err}, \text{or}$$

$$c_{rec} = c_{pred} + d_{err},$$

in which $d_{err}$ are dequantized values of the prediction error.

7. The method according to claim 6, wherein same quantization parameters are used with quantization of the transform coefficients $I_{pred}$, and with quantization of prediction error.

8. The method according to claim 6, wherein different quantization parameters are used with quantization of the transform coefficients $c_{rec}$, than with quantization of prediction error.

9. A method for transmitting video information, in which at least a bit-stream is formed from the video information, the bit-stream comprises a first set of frames comprising at least one video frame, and a second set of frames comprising at least one predictive video frame, at least partly different encoding parameters are used with encoding of the frames of said first set of frames and said second set of frames, at least one frame of said bit-stream is being transmitted, and the transmission is switched over from said first set of frames to said second set of frames, wherein in switching the transmission over from said first set of frames to said second set of frames, the second set of frames comprises at least one primary switching frame, a secondary switching frame corresponding to the at least one primary switching frame is transmitted, the secondary switching frame having been encoded using the encoding parameters of the corresponding at least one primary switching frame in the second set of frames and at least one reference frame from the first set of frames in such a way that when the secondary switching frame is decoded its reconstructed pixel values are identical to those that would have resulted from transmission of the at least one primary switching frame in the second bit-stream, the transmission is continued to transmit at least one frame subsequent to the primary switching frame from said second set of frames and said secondary switching frame is used in place of the primary switching frame as a reference frame to be used in the reconstruction of said at least one predictive video frame of the second set of video frames, and that for recovering from transmission errors said secondary switching frame is transmitted, wherein said secondary switching frame is a predictive video frame, in which prediction information comprises prediction information from earlier video frames than the preceding frame of the predictive video frame.

10. A method for transmitting video information, in which at least a bit-stream is formed from the video information, the bit-stream comprises a first set of frames comprising at least one video frame, and a second set of frames comprising at least one predictive video frame, at least partly different encoding parameters are used with encoding of the frames of said first set of frames and said second set of frames, at least one frame of said bit-stream is being transmitted, and the transmission is switched over from said first set of frames to said second set of frames, wherein in switching the transmission over from said first set of frames to said second set of frames, the second set of frames comprises at least one primary switching frame, a secondary switching frame corresponding to the at least one primary switching frame is transmitted, the secondary switching frame having been encoded using the encoding parameters of the corresponding at least one primary switching frame in the second set of frames and at least one reference frame from the already transmitted at least one frame of said first set of frames in such a way that when the secondary switching frame is decoded its reconstructed pixel values are identical to those that would have resulted from transmission of the at least one primary switching frame in the second bit-stream, the transmission is continued to transmit at least one frame subsequent to the primary switching frame from said second bitstream and said secondary switching frame is used in place of the primary switching frame as a reference frame to be used in the reconstruction of said at least one predictive video frame of the second set of video frames, and that for recovering from transmission errors said secondary switching frame is transmitted, wherein said secondary switching frame is a predictive video frame, in which prediction information comprises only intra prediction information.

11. The method according to claim 1, wherein both said at least one primary switching frame and said secondary switching frame produce the same reconstruction result of said at least one predictive video frame.

12. The method according to claim 1, wherein both said at least one primary switching frame and said secondary switching frame have the same reconstructed values.

13. Apparatus comprising an encoder for forming at least a first bit-stream and a second bit-stream from a video information, the first bit-stream comprises a first set of frames comprising at least one video frame, and the second bit-stream comprising a second set of frames comprises at least one predictive video frame, and configured to use at least partly different encoding parameters with encoding of the frames of said first bit-stream and said second bit-stream, configured to transmit at least one frame of said first bit-stream, and configured to switch the transmission over from said first bit-stream to said second bit-stream, wherein said switching the transmission over from said first bit-stream to said second bit-stream comprises encoding a secondary switching frame using the encoding parameters of the second bit-stream and reference frames from the first bit-stream in such a way that when the secondary switching frame is decoded its reconstructed pixel values are identical to those otherwise resultant from transmission of the at least one primary switching frame in the second bit-stream for use in place of a primary switching frame included in the second bit-stream to enable to switch the transmission over from said first bit-stream to said second bit-stream.

14. The encoder according to claim 13, configured to produce prediction information by using said reference frames, and to perform quantization and dequantization to the prediction information.

15. The encoder according to claim 13, configured to produce prediction information by using said reference frames, and to transform the prediction information.

16. A decoder for decoding a video information from a signal comprising frames from at least a first bit-stream and a second bit-stream, which are formed from the video information, the first bit-stream comprises a first set of frames comprising at least one video frame, and the second bit-stream comprises a second set of frames comprising at least one predictive video frame, and at least partly different encoding parameters are used with encoding of the frames of said first bit-stream and said second bit-stream, wherein the decoder is configured for decoding a secondary switching frame, said secondary switching frame having been encoded using the encoding parameters of the second bit-stream and at least one reference frame from the first bit-stream, and added to said signal in place of a primary switching frame as a reference frame to be used in the reconstruction of said at least one predictive video frame of the second set of video frames, said decoder is configured to use decoding parameters of the second bit-stream and reference frames from the first bit-stream.

17. The decoder according to claim 16, wherein the primary switching frame comprises areas encoded by intra prediction using only spatial correlation, and areas encoded by inter prediction using motion compensation, wherein the decoder is configured to use motion compensation information with reconstruction, to use spatial correlation information with reconstruction, and to perform the reconstruction of each area either by use of said motion compensation information or by use of said spatial correlation information, depending on the prediction method used by encoding of the respective area.

18. A decoder for decoding a video information from a signal comprising at least one video block and at least one predictive video block, said predicted video block being predicted from said at least one video block, the decoder including a memory for storing reference information on previously decoded blocks, and a predictor for forming a predicted block by using the reference information stored in the memory, wherein the decoder further comprises:

a transformer for transforming the predicted block to form a transformed predicted block, and a summer for summing the transformed predicted block with an information representative of a current block to obtain summed information for use in decoding of the current block.

19. A decoder according to claim 18, wherein it includes an inverse quantizer and an inverse transformer for inverse quantizing and for inverse transforming the current block after said summing.

20. A decoder according to claim 18, wherein it includes a quantizer for quantizing said transformed predicted block before said summing.

21. A decoder according to claim 20, wherein said information representative of the current block has been obtained by at least transforming and quantizing a video block, said transformation and quantization being identical with said transformation and quantization used with said predicted block.

22. A decoder according to claim 18, wherein said information representative of the current block has been obtained by at least transforming and quantizing a video block, wherein the decoder includes an inverse quantizer for inverse quantizing said information representative of the current block before said summing.

23. A decoder according to claim 22, wherein it includes a quantizer, an inverse quantizer and an inverse transformer for quantizing, inverse quantizing and inverse transforming the current block after said summing.

24. A decoder according to claim 18, wherein said information representative of the current block has been obtained by at least transforming and quantizing a video block, wherein the decoder includes a normalization block for scaling said information representative of the current block before said summing.

25. A decoder according to claim 18, wherein transform basis functions are arranged to be used in the transformation.

* * * * *